United States Patent [19]

Minix

[11] Patent Number: 5,523,836
[45] Date of Patent: Jun. 4, 1996

[54] METHOD AND APPARATUS FOR ORIENTING A LENS' REFRACTIVE CHARACTERISTICS AND LAY-OUT PROPERTIES

[76] Inventor: Marcus S. Minix, 327 Mayo Plz., Paintsville, Ky. 41240

[21] Appl. No.: 333,375

[22] Filed: Nov. 2, 1994

[51] Int. Cl.⁶ ........................................... G01B 9/00
[52] U.S. Cl. ............................. 356/124; 356/127
[58] Field of Search ...................... 356/124, 127

[56] References Cited

U.S. PATENT DOCUMENTS

| | | | |
|---|---|---|---|
| 4,330,203 | 5/1982 | Oppenheim et al. | 356/127 |
| 4,730,924 | 3/1988 | Allard et al. | 356/124 |
| 5,108,174 | 4/1992 | Lippens | 356/124 |
| 5,307,141 | 4/1994 | Fujieda | 356/124 |

FOREIGN PATENT DOCUMENTS 57-163839   10/1982   Japan ..................... 356/127

*Primary Examiner*—Frank Gonzalez
*Assistant Examiner*—Jason D. Eisenberg
*Attorney, Agent, or Firm*—Stanley M. Welsh

[57] ABSTRACT

To determine and block the orientation of a lens located in only one location by both its refractive characteristics and lay-out properties preparatory for edge grinding relative to a template pattern, two scenes: a refractive scene and a lay-out scene are produced by light passed through such lens. One or more emissions of light are directed by one or more of the following: (1) one or more beam splitters and (2) one or more mirrors. In some embodiments, the two scenes can be observed separately, in others superimposed by optical or electronic devices. Simultaneous production of both scenes visually demonstrates Prentice's Law, P=hd. When a shadow receiver is present to receive shadows of non-marked multifocal segments in the lay-out scene, the width of the emission of light used to produce the refractive scene is defined by one or more apertures of such shadow receivers. Because lens movement is minimized by this invention and both refractive characteristics and lay-out properties are oriented substantially at the same time with the lens in substantially the same location, errors are minimized and automation is facilitated.

70 Claims, 13 Drawing Sheets

METHOD AND APPARATUS FOR ORIENTING A LENS' REFRACTIVE CHARACTERISTICS AND LAY-OUT PROPERTIES

1. FIELD OF INVENTION

This invention is generally concerned with orienting a lens by its refractive characteristics and lay-out properties, while such lens remains in substantially the same position. It is more particularly, but not exclusively, concerned with directing light used in performing such lens orientations. It is even more particularly concerned with revealing a lens support means which is substantially transparent to light used during performing such orientations.

2. DESCRIPTION OF THE PRIOR ART

Currently, a technician uses two devices to orient a lens-to-be-edged preparatory for edge grinding. The first is a lensmeter and the second is a blocker. Lensmeters are of two types, reticle telescope tube and electronic. Both pass an emission of light through a lens and into a field of view ("FOV"), which emission is suitable for orienting such lens by its refractive characteristics, e.g. sphere, cylinder, cylinder axis, and prism.

The emission on the reticle telescope tube lensmeter is a single refractive light beam. This single refractive light beam is passed from a projector assembly toward and through the lens and then through a reticle telescope tube into a technician's field of view. This projector assembly contains a single lamp and two associated elements, a two-coordinate target and a collimating lens, which characterize the emission.

The emission of light on an electronic lensmeter comprises multiple refractive light beams. The multiple light beams are emitted from a refractive light source having either multiple point light sources or a single lamp passing light through a multiple pin hole mask. These multiple light beams are passed toward and through the lens and then impinge on an electronic light receiving means.

The path traveled by an emission of light from its refractive light source means toward and through the lens into a refractive FOV is herein referred to as the "refractive observation path" or "ROP".

On the electronic lensmeter, the electronic light receiving means along with associated electronic circuitry produces an electronic image on a monitor screen of the actual refracted position of each light beam impinging on such means.

Both types of lensmeters have a refractive orienting means. A refractive orienting means is usually a transparent centering reticle with concentric circles calibrated in prism diopters. The reticle in the reticle telescope lensmeter is located in the ROP and in the focal plane of the telescope tube ocular. In the reticle telescope tube lensmeter, the FOV of the reticle and the apparent position of the target characterized in the single refractive light beam is observed directly by a technician through a reticle telescope tube. The reticle on the electronic lensmeter is located on the monitor screen and not in the ROP. The field of view of the actual position of the refractive light beams relative to the reticle is indirectly observed by a technician on the monitor screen.

The apparent or actual refracted image produced of an emission of light passed through a lens into a FOV relative to a refractive orienting means is herein referred to as the "refractive scene". The refractive scene is used to orient a lens by aligning its refractive characteristics. While observing the refractive scene, a technician moves the lens in a plane horizontal to the ROP and against a single lens stop. The ROP and the lens axis are collinear.

Well-known reticle telescope tube lensmeters are the Bausch and Lomb Vertometer manufactured by Leica, Rochester, N.Y., and the Lensmeter distributed by Marco Ophthalmic, Inc., Jacksonville, Fla.

The third embodiment in U.S. Pat. No. 4,730,924 of Allard et al shows the refractive scene produced on a monitor screen along with a digital display of the sphere, cylinder, and cylinder axis, calculated automatically by associated electronic circuitry connected to the electronic light receiving means.

An emission of light comprising four light beams is shown directed in a ROP to an electronic analysis plane in the electronic lensmeter of U.S. Pat. No. 5,108,174 of Lippens, Paris, France. As described in that patent, widely spaced multiple light beams can be reduced in width by afocal means. Reduction in the width of multiple light beams produces a narrower ROP and permits sampling a smaller area of the lens-to-be-edged to prevent multifocal interference in the ROP FOV.

The resultant refractive orientation of a lens is marked on its surface with three refractive reference points by an inked pen mechanism attached to a lensmeter. The center point represents the optical center and all three points together represent a line of cylinder axis orientation.

After marking the refractive orientation of a lens, it is currently removed and positioned in a second apparatus, usually a blocker. Typical blockers are shown in U.S. Pat. No. 4,330,203 of Gerd Openheim, et al, the Speede Blocker manufactured by AIT Industries, Skokie, Ill., and the Accu-Bloc manufactured by Opti-Vue, Inc., Detroit, Mich.

In most blockers the the light source means is a single lamp and in others a single lamp with a collimating lens. The blocker lay-out orienting means is usually a transparent two-coordinate grid. The path of the emission of light, usually unidirectional illumination, directed through the lens-to-be-edged illuminating its lay-out properties and into a FOV relative to a lay-out orienting means is herein referred to as the "lay-out observation path" or "LOP". Lay-out properties refer to any traits of a lens capable of producing a shadow, e.g. a multifocal segment and the refractive reference points.

The emission of light is usually used to cast shadow images of the lens' lay-out properties onto a semi-frosted screen positioned in the LOP FOV. This method of shadowing is useful where the outline and center of a majority of multifocal segments have not previously been marked for reference. Additionally, a moveable lay-out orienting means, such as a multifocal centering plate with parallel lines, can be present in the LOP. This moveable lay-out orienting means is used to center a multifocal along the horizontal axis in relation to the two-coordinate grid.

The shadowed or actual image of the lens' illuminated lay-out properties produced when the emission of light is directed toward and through a lens into a FOV relative to a lay-out orienting means is herein referred to as the "lay-out scene." The lay-out scene is used to orient a lens by positioning its lay-out properties relative to the lay-out orienting means so that mounting the lens will provide appropriate correction to a wearer of an eyeglass frame into which such lens has been appropriately oriented and fitted by edge grinding.

The lens is geometrically referenced in relation to the vertex of the two-coordinate grid, which vertex corresponds to the vertex of a template pattern. This lens reference is known as the lens geometric grinding center. Traditionally, the geometric grinding center was marked by hand with an inked pen. Currently on a blocker, by deployment of blocking arm, a block is attached to the geometric grinding center by double-faced tape. This block fixes the lens' refractive and lay-out orientation relative to the desired pattern during edge grinding to shape and size in an edge grinding machine.

Currently the refractive scene can no longer be observed upon transferring the lens-to-be-edged from a lensmeter to a blocker or any other second device which is used to prepare a lens for edge grinding and final mounting. Therefore, any error of refractive orientation induced by the following consecutive operations cannot be compared to the ophthalmic standards of the FDA or the American National Standards Institute prior to blocking and edge grinding: (1) unwanted shifting during refractive orientation in a lensmeter; (2) errors from, but also inherent if any, marking of refractive reference points in a lensmeter; (3) removing the lens from a lensmeter; (4) placing the lens in a blocker; (4) unwanted shifting of the lens' lay-out and refractive orientation before blocking; and (5) blocking the lens. The presence of such block prevents verification of the refractive and lay-out orientation prior to edge grinding and final mounting.

A blocker has three widely spaced lens supports which do not support unlike lenses at a comparable vertex distance in a ROP. A lensmeter does not have a transparent lens stop support means to support a lens in a LOP. Nor does a lensmeter have a blocking means to permit a lens to be blocked in a refractive scene based on the amount prismatic deviation induced by linear decentration as described by the mathematical relationship of Prentice's Law, $P=hd$. Since a lens is removed from a lensmeter to a second device, this mathematical relationship can not be visually demonstrated.

Marking and transferring a lens-to-be-edged is known to prevent automation, introduce cumulative errors, and prevent simultaneous synchronization of its orientation by both its refractive characteristics and lay-out properties.

For at least twenty years, the desirability has been known to orient and verify a lens by its refractive characteristics in a refractive scene simultaneously with orienting its lay-out properties in a lay-out scene prior to blocking. It would be very desirable to combine: (1) the capability of a lensmeter with the lay-out of a lens on a measuring grid to determine its geometric grinding center; (2) the capability of a lensmeter with blocker; or (3) the capability of a lensmeter with any other device that prepares a lens for final grinding, but in spite of such desirability, it has never been done until this invention.

OBJECTS AND ADVANTAGES OF THE INVENTION

Accordingly, some of the objects of this invention which appear at least in part as features of some of the embodiments of this invention are to:

1. Provide a machine which combines two devices, a lensmeter and a blocker, where a technician may observe both a refractive scene produced and a lay-out scene with or without a semi-frosted screen;
2. Permit a lens-to-be-edged to remain in substantially the same position when one or more of the following occur: (1) its refractive characteristics are oriented; (2) its refractive characteristics are determined; (3) its refractive reference points are marked; (4) its lay-out properties are oriented; (5) its geometric grinding center is marked or blocked;
3. Increase the accuracy of orienting the refractive characteristics of a lens-to-be-edged in relation to its lay-out properties in preparation for final grinding in an edge grinding machine;
4. Permit simultaneous verification of the refractive characteristics, the refractive orientation, the lay-out properties, the lay-out orientation, and the geometric grinding center of a lens-to-be-edged prior to blocking;
5. Permit more rapid preparation of a lens-to-be-edged for edge grinding than is otherwise possible by the prior art methods which require a step of moving the lens from a lensmeter to a measuring grid;
6. Decrease cumulative error which can result from consecutive operations of orienting refractive characteristics and marking its refractive reference points on a lensmeter, removing it from the lensmeter, placing it on a measuring grid, geometrically centering its lay-out properties, and blocking;
7. Fabricate a machine of less expense, where a single lens location permits both the operations of lensmeter to determine, orient, and mark its refractive characteristics, and the operations of a blocker to position its lay-out properties on a transparent measuring grid and block its geometric grinding center;
8. Combine a lensmeter with a blocker that will enable automation of the whole process in ways not previously possible due to unavoidable errors introduced and difficulties caused by manual transfer from one machine to another;
9. Permit the refractive characteristics of a lens to be oriented and blocked solely by observing its prismatic deviation produced in a refractive scene based on Prentice's Law, rather than by observing linear decentration produced in lay-out scene, thus eliminating the required conventional step of marking.
10. Provide components that are specifically adapted and designed for use in some of the machines of this invention.

SUMMARY OF THE INVENTION

Broadly, the invention permits a technician to orient a lens by both its refractive characteristics and lay-out properties while such lens remains in substantially the same position. The invention also discloses: (1) methods for directing two substantially collinear observation paths through a lens for use in both such orientations; (2) a lens support means which permits a lens to be supported in light suitable for both such orientations; and (3) modifications of conventional lay-out scene elements permitting simultaneous production by light of both a lay-out and refractive scene.

In some embodiments and schematic configurations exemplified in this Specification, these two scenes are produced in separate fields of view permitting a lens to be oriented first in a refractive scene and then in a lay-out scene, or in the reverse order. In other embodiments, the scenes are superimposed, assisted by either optical or electronic means, permitting a lens to be oriented in both scenes in one FOV. Preferably in a superimposed scene, the superimposed linear calibrations of the orienting means in both scenes are correlated by Prentice's Law, $P=hd$.

The term "light source means" is used throughout the Specification and claims to mean one or more radiant energy sources, which along with associated elements is used to characterize an emission of light. For example, such light source means can comprise one or more lamps or light emitting diodes along with associated elements such as a multiple pin hole mask or a two-coordinate target through which the emission of light is directed.

The term "refractive light beam" is used throughout the Specification and Claims to mean that family of light rays emanating from a refractive light source means, which rays are directed toward and through a lens into a FOV in a ROP and are used to determine the refractive orientation of a lens. The term "lay-out light beam" is used throughout the Specification and Claims to mean that family of light rays emanating from a lay-out light source means, which rays are directed toward and through a lens into a FOV in a LOP and are used to determine the lay-out orientation of such lens.

Note that a light source means used to produce both scenes need not be different in radiant energy properties although its emission of light may be directed and characterized in separate paths by an associated element. Hence in some configurations exemplified in this Specification, the same light source means can be used to produce both a refractive and lay-out scene. For example, a collimating lens can be positioned in one part of the light directed from a lamp for illumination in the LOP, and a multiple pin hole mask or target positioned in another part of the light directed from such lamp for refractive displacement in the ROP.

In each embodiment and configuration, the emission of light in the ROP and LOP are preferably directed by: (1) one or more of the following: modifying, repositioning, or removing conventional elements used to produce a lay-out scene; and (2) using one or more of the following elements: one or more mirrors, and one or more beam splitter means. The invention demonstrates configurations using either one or two light source means to produce either one or two observation path fields of view. Still other configurations will be clear to a person of average skill in the art based upon disclosure in this Specification, especially in regard to the arrangement of light soure means, elements used to direct emissions of light such as beam splitter means and mirrors, and elements in the observation path fields of view.

The term "electronic light receiving means" is used in the Specification and claims to indicate a means for producing electrical discharges in response to incident radiant energy, such as a photosensitive electronic plate, electronic analysis plane, or a charge-coupled device.

An orienting means can be present in a ROP or LOP FOV when such FOV is observed directly by a technician or such FOV is imaged on a monitor screen by a charge-coupled device with associated electronic circuitry. When an electronic light receiving means, such as a photosensitive position sensor plate with associated electronic circuitry, produces an electronic image of the actual position of one or more light beams on a monitor screen, in contrast to the image of the FOV, the refractive orienting means is located relative to the FOV of such monitor screen image in contrast to being located in a ROP or LOP.

Elements of either the reticle telescope tube or electronic lensmeter type can be incorporated into the invention. However, lensmeter elements which would conflict with the position of an element of the invention used to direct an emission of light, such as a mirror or a beam splitter means, or used to orient a lens, such as an orienting means, are difficult to incorporate.

Throughout the Specification and claims the terms "transparently" or "substantially transparent" are used in connection with passage of light along some path. These terms in such context mean that such passage through some element does not significantly interfere, e.g. does not prevent, an accurate or substantially accurate determination of some property being measured by means of such light. Examples of properties of interest in this invention are refractive characteristics or locations of multifocal segments of a lens.

The terms "at least in part" are used in connection with an emission of light passed through or reflected from a beam splitter means. These terms in such context mean that such emission is partially passed through or partially reflected by such means.

Preferably, a shadow receiving means is present in the LOP to orient non-marked multifocal lenses. However, the invention can function without a shadow receiving means for orienting the actual image of a lens' lay-out properties. This is different from the shadowed image which is typically preferred to mark multifocal lenses or single vision lenses. The invention demonstrates the possibility of moving a shadow receiving means in and out of the LOP so that, as will be explained later, the width of the emission of light in the ROP is not restricted in width.

Preferably, the emissions of light in both the ROP and LOP are directed toward and through the lens at the same time, and preferably intersect at least in part in a substantially collinear section when passing through the lens. The emission of light in the ROP is partially, but preferably totally, surrounded by the emission of light in the LOP. However, it is possible to alternately switch on and off the light in either path. In some configurations, the direction traveled by emissions of light in the ROP and the LOP while passing along this substantially collinear section is in the same direction in some embodiments and configurations, but in others, in opposite directions.

While it is possible to direct an emission of light in a ROP or a LOP obliquely through a lens and to correct for such oblique lens orientation by methods of mathematics, optical correction, computerization, or in relation to skewed orienting means, it is preferable that the lens be positioned in a substantially perpendicular plane to the emission of light in a collinear section of the ROP and LOP, and that the refractive orienting means and the lay-out orienting means also be positioned in a perpendicular plane to the emission of light in the ROP and the LOP, respectively. Consequently, one skilled in the art can orient a lens by familiar conventional methods without the need to make corrections for lens orientations which are not substantially perpendicular to all emissions of light which give rise to either a ROP or LOP.

DESCRIPTION OF THE PREFERRED EMBODIMENTS

First Embodiment

REFERRING TO FIG. 1.

Figure 1:
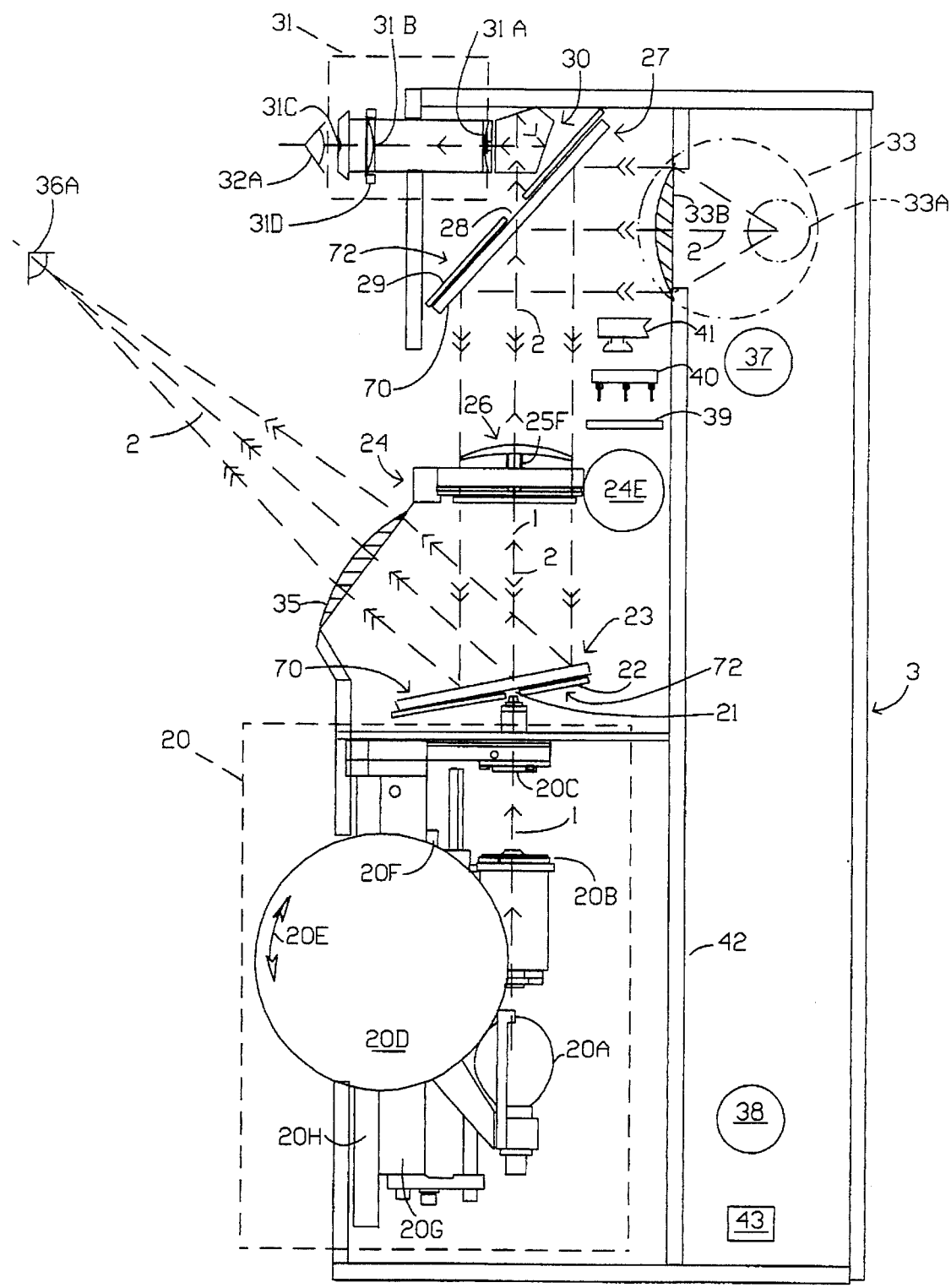
FIG. 1 is a side elevation view in partial cross-section with side removed showing a first embodiment of this invention.

FIG. 1 is a side elevation view with side removed to reveal the components of the first embodiment. In the embodiments of this Specification, the refractive observation path (ROP) is depicted by chain-line 1, and referred to as ROP 1; and the lay-out observation path (LOP) is depicted by chain-line 2, and referred to as LOP 2.

Figure 7:
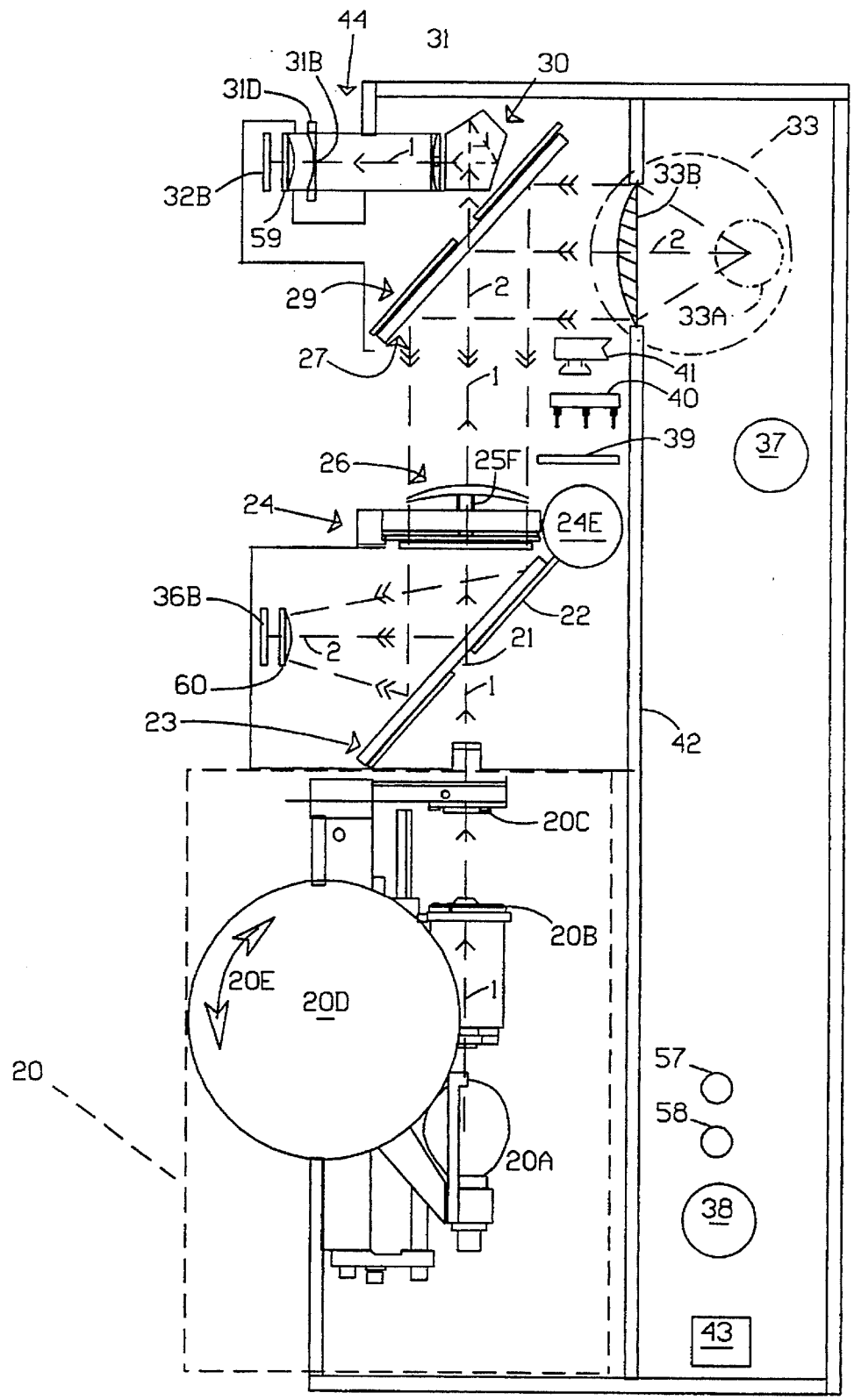
FIG. 7 is a side elevation view in partial cross-section with side removed showing a third embodiment of this invention.
Figure 10:
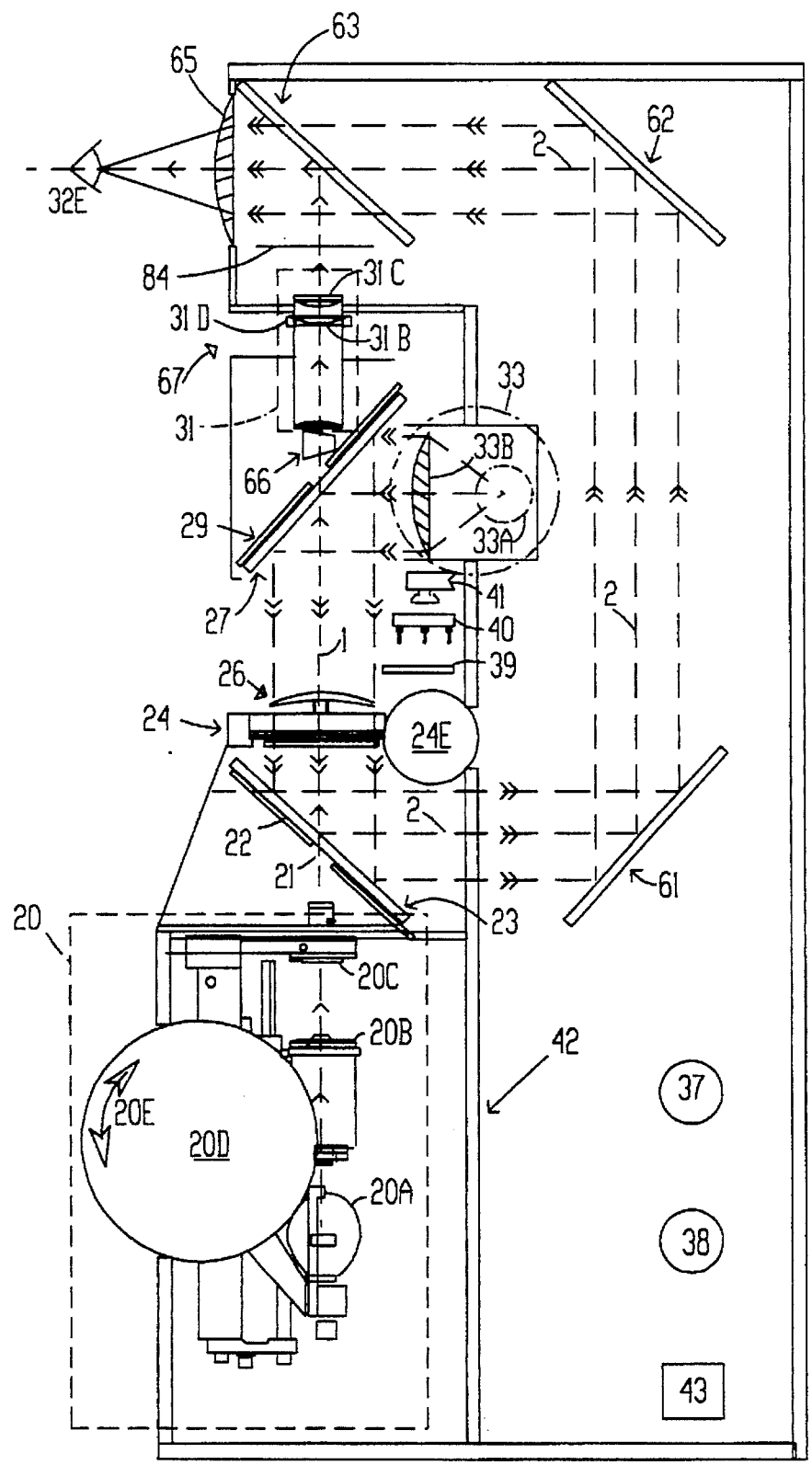
FIG. 10 is a side elevation view in partial cross-section with side removed showing a fifth embodiment of this invention.

The example of light source means at one end of ROP 1 shown in the embodiments of FIGS. 1, 7, and 10 is the projector assembly of the Vertometer Model 7. This projector assembly is outlined by chain-dotted line 20. Light emitted from 20A through target 20B and passed through collimating lens 20C in a direction depicted by double wire arrows along ROP 1, produces a single refractive light beam.

The refractive orienting means shown is centering reticle 31B located in ROP 1 at the focal plane of ocular 31C of Vertometer telescope tube assembly. The reticle telescope tube assembly is contained within chain-dotted line 31. Knurled knob 31D of reticle telescope tube 31 is exposed to permit axial orientation of reticle 31B. Reticle 31B is illuminated in the FOV in ROP 1 by the emission of light from lamp 20A. The single refractive light beam in ROP 1 of the first embodiment is characterized by illumination of target 20B and reticle 31B.

Figure 5:
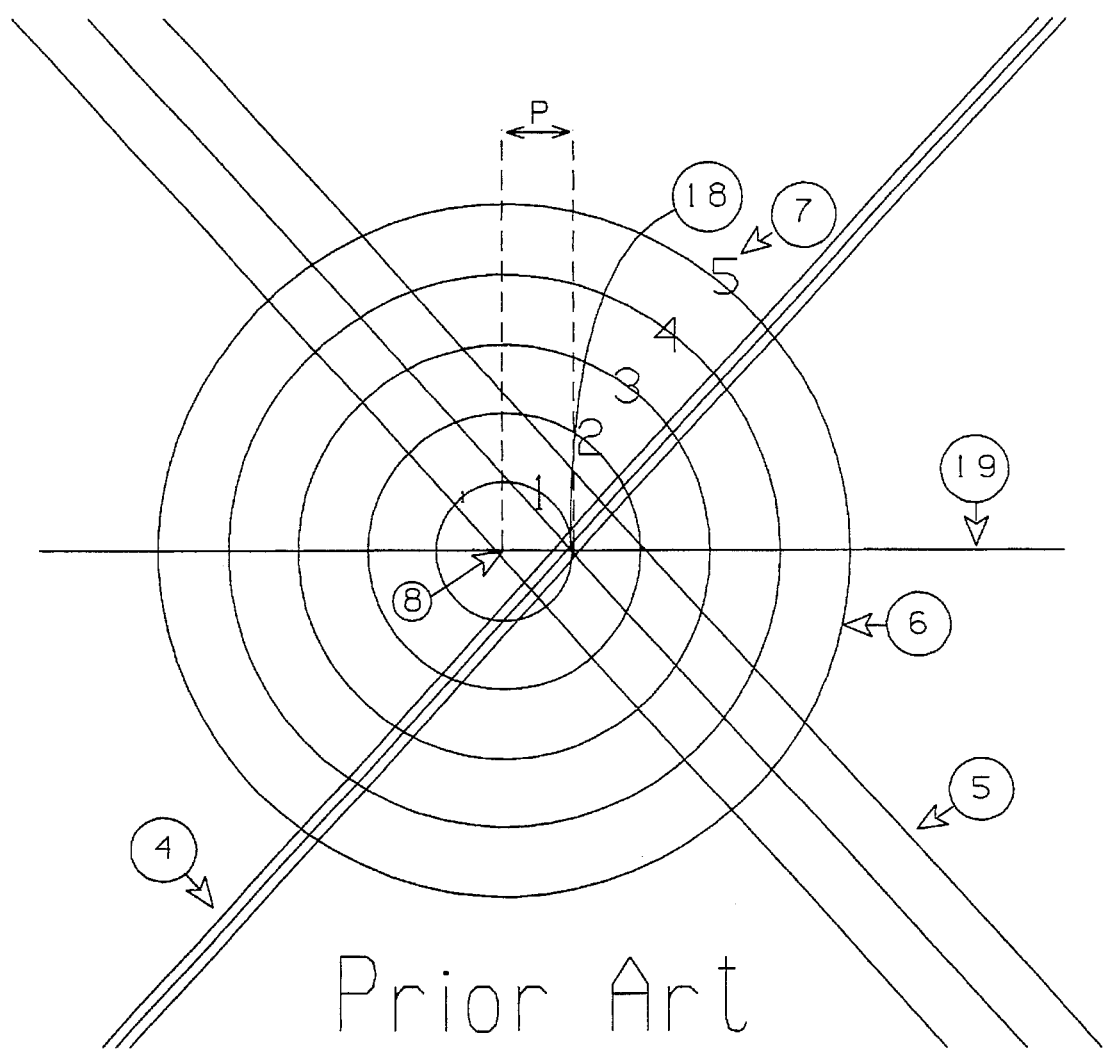
FIG. 5 is an example of a conventional refractive scene.

At the other end of ROP 1 in this embodiment, a technician, depicted by schematic eye 32A, observes the FOV in ROP 1. From schematic eye 32A, the FOV of the displacement of the apparent image of target 20B relative to reticle 31B in ROP 1 comprises the refractive scene. An example of such refractive scene is shown in FIG. 5.

The precise location of a refractive orienting means is not critical to the invention. It is located in a FOV relative an emission of light suitable for orienting a lens by its refractive characteristics, which emission is directed toward and through the lens. Historically during hand neutralization, a refractive orienting means, such as a two-coordinate target, was located behind a lens and its image of apparent displacement was observed in a FOV through the lens.

The mechanical operation of the Vertometer projector assembly 20 is well-known. It is used to determine the sphere, cylinder, and cylinder axis of a lens by operation of power drum 20D and an axis drum hidden on the reverse side of projector assembly 20.

Alternatively, the projector assembly or reticle telescope tube of any reticle telescope lensmeter, such as the Marco Lensmeter, could be substituted for their equivalents.

In the first embodiment, this emission of light in ROP 1 is directed successively through the following elements with the following effects: (a) aperture 21 in first light trap 22, substantially unchanged; (b) first beam splitter 23, passed at least in part transparently; (c) apertures modified in conventional elements of blocker lens stage assembly 24 described and shown in FIGS. 2A, 2B, and 3, substantially unchanged; (d) opening 25E of lens stop 25F described in FIGS. 2A and 2B, substantially unchanged; (e) lens 26, refractively displaced; (f) second beam splitter 27, passed at least in part transparently as refracted; (g) aperture 28 in second light trap 29, unchanged as refracted; (h) penta prism 30, reflected as refractively displaced so that the image of target 20B is not inverted or reversed in the FOV, such as at schematic eye 32A shown; and (i) elements of a conventional telescope reticle tube encircled by chain-dotted line 31, telescopically magnified as refractively displaced, and comprised of the following elements: objective lens mount assembly 31A, centering reticle 31B, and collective lens mount assembly 31C. The emission of light in ROP 1 is preferably refractively displaced only by lens 26.

Light traps 22 and 29 are each a layer applied or juxtaposed adjacent to the surface of beam splitters 23 and 27, respectively, which is not used to reflect any light. Since they are used to absorb rather than transparently transmitting light, they are preferably black.

Figure 6:
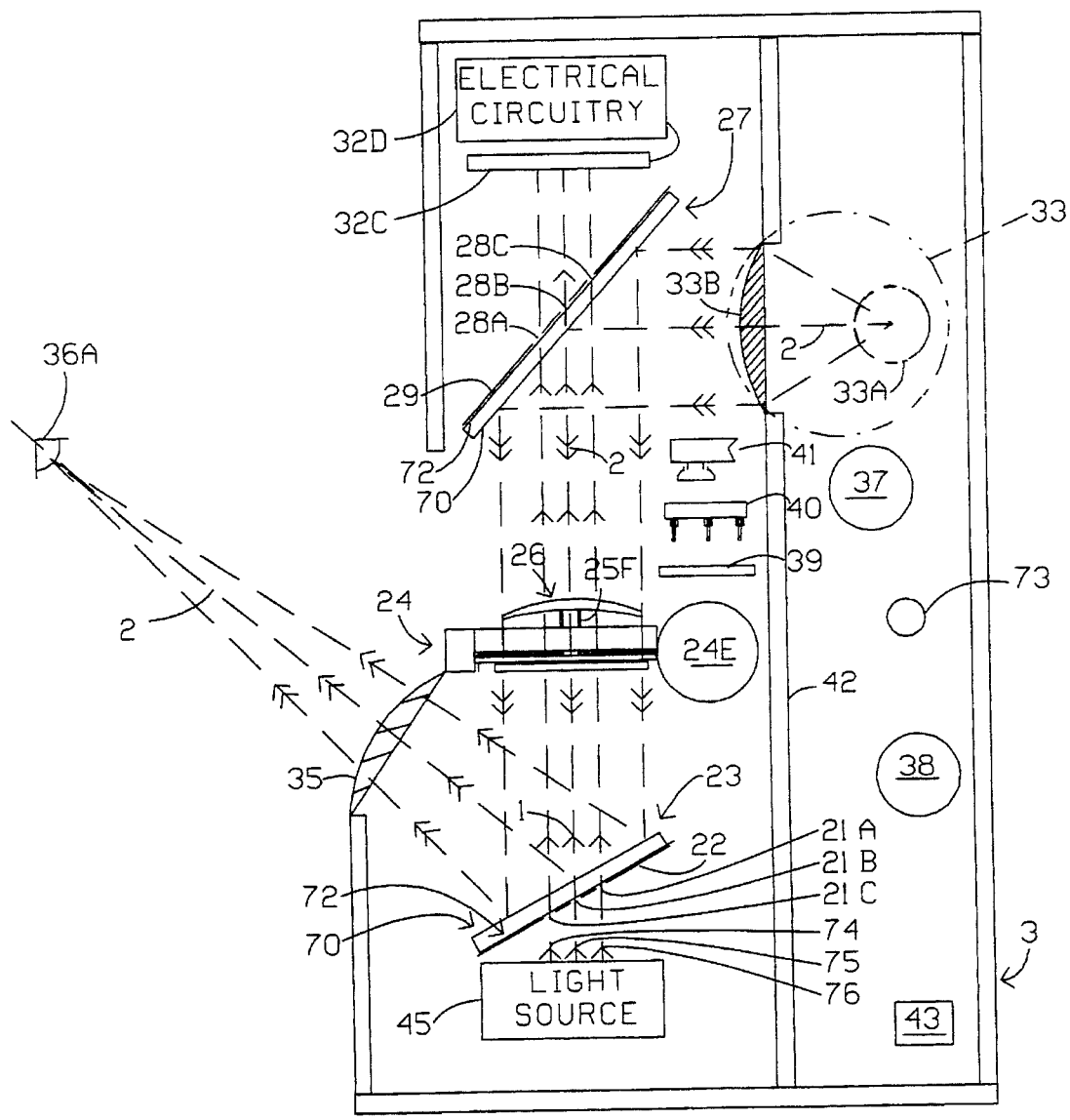
FIG. 6 is side elevation view in partial cross-section with side removed showing a second embodiment of this invention.
Figure 9:
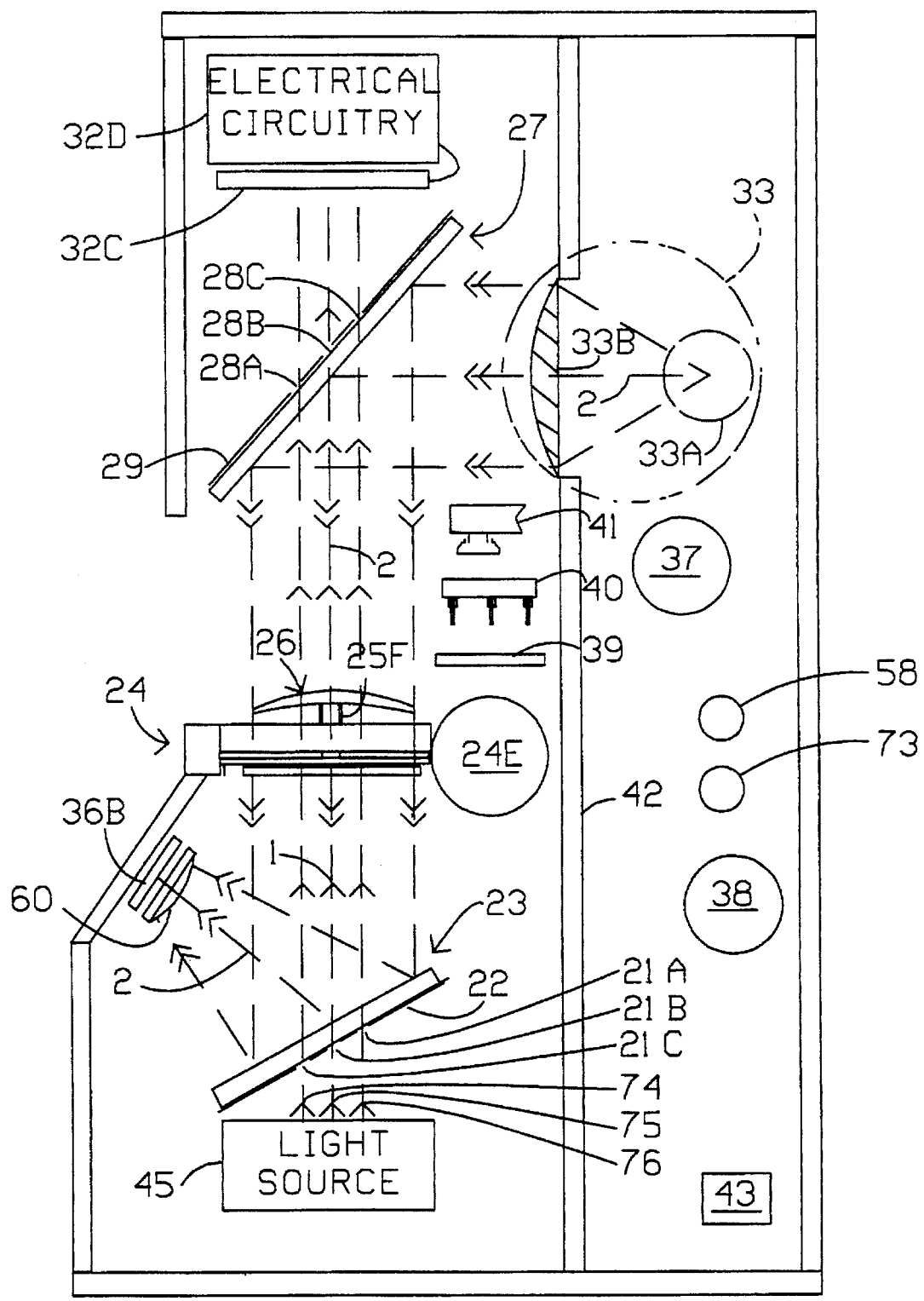
FIG. 9 is a side elevation view in partial cross-section with side removed showing a fourth embodiment of this invention.

The emission of light in ROP 1 of the single refractive light beam in the embodiment of FIG. 1 has a narrower width than the emission of light in ROP 1 of the multiple light beams shown in the embodiments of FIGS. 6 and 9. An emission comprised of multiple light beams in a wider ROP 1 can be directed in the narrow ROP 1 of FIG. 1 by afocal width reduction which can be made to occur by methods well known in the art, for example prior to entering aperture 21 of light trap 22.

At a first end of LOP 2 in FIG. 1 is a light source means encircled by chain-dotted line 33. It is comprised of lamp 33A with condensing lens 33B. Of course this light source means could comprise multiple lamps with or without a condensing lens to illuminate the lay-out properties of a lens. For example, two lamps could be positioned at an increased distance from lens 26 without a condensing lens. The direction of the emission of light in LOP 2 is depicted by double wire arrows directed from lamp 33A and condensing lens 33B successively by elements with the following effects: (a) second beam splitter 27, reflected at least in part; (b) lens 26, illuminated; (c) elements contained in blocker lens stage assembly 24 which are described in detail in connection with FIGS. 2A, 2B, and 3, transmitted substantially transparently; (d) first beam splitter 23, reflected at least in part; and (d) optional magnifying lens 35, magnified.

Figure 3:
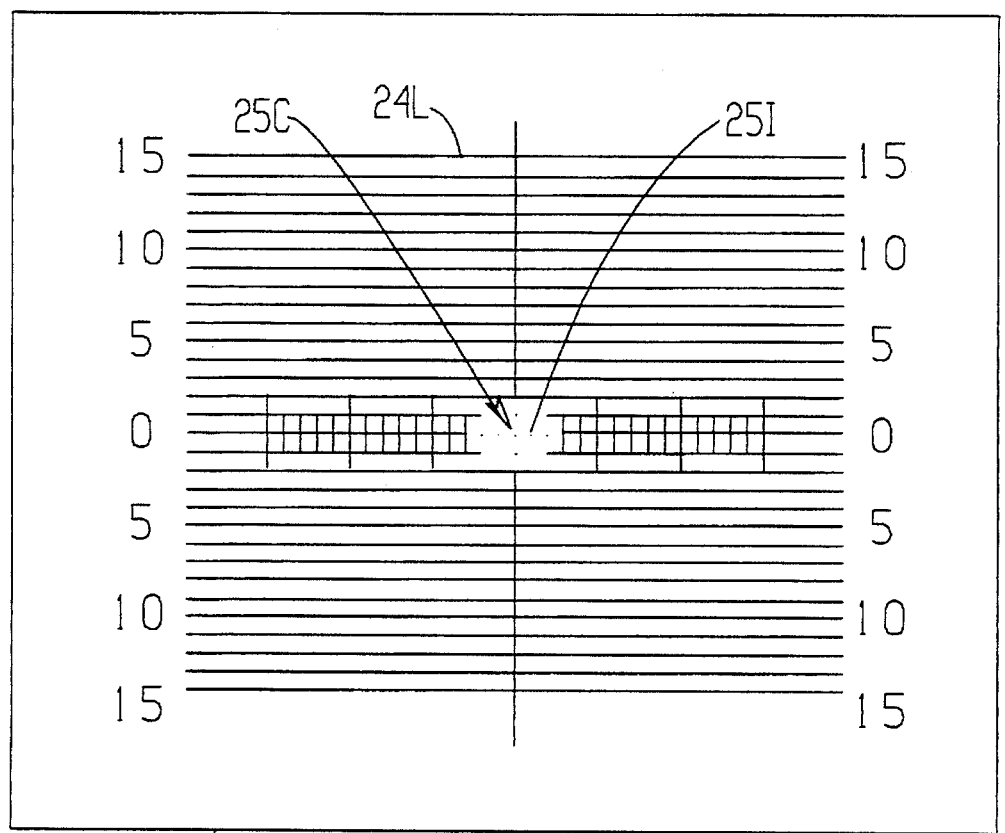
FIG. 3 shows modifications of a conventional measuring grid 24C that were made and specifically adapted for use in this invention.
Figure 4:
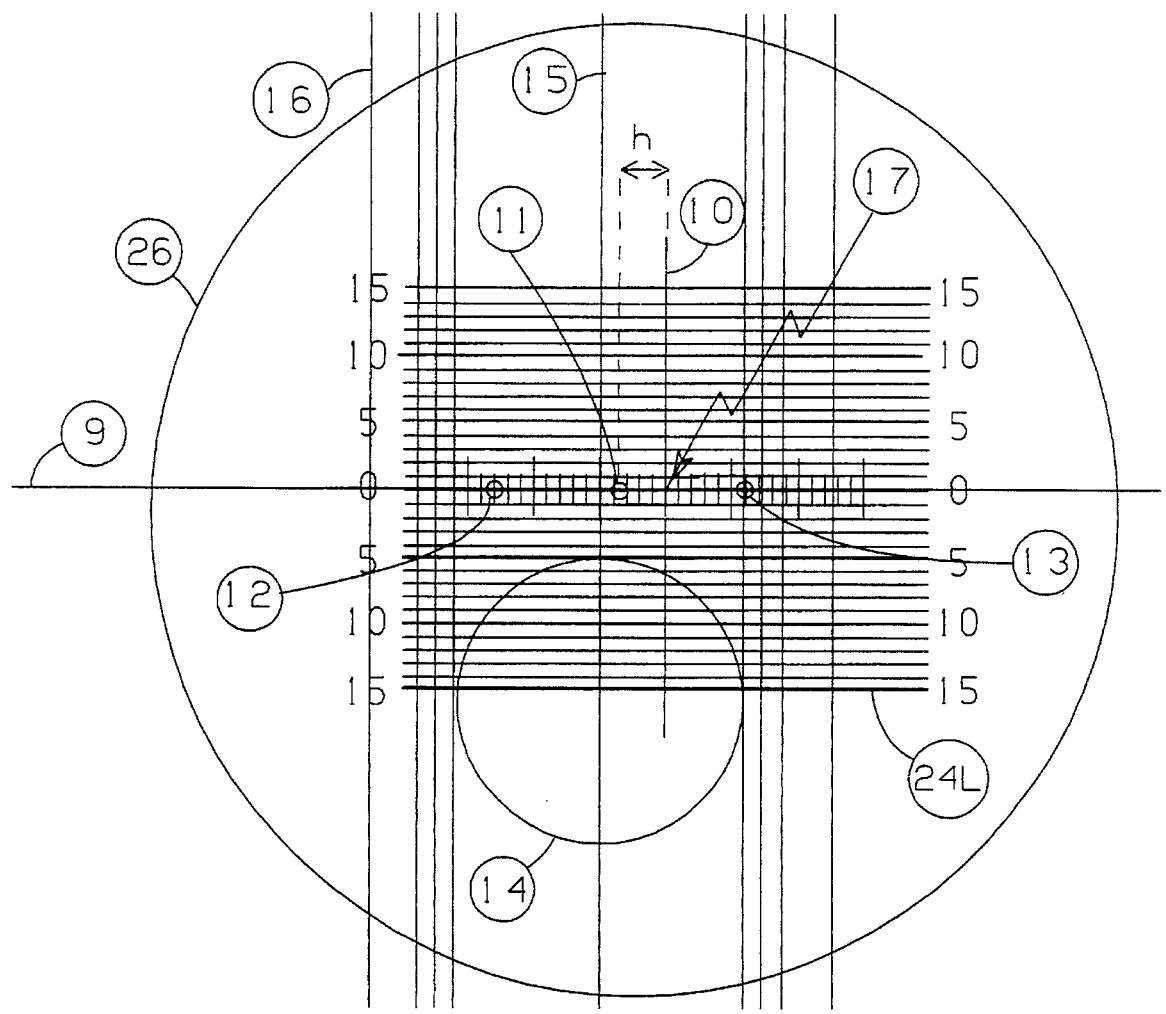
FIG. 4 is an example of a conventional lay-out scene.

At this end of LOP 2, a technician as depicted by schematic eye 36A, observes through magnifying lens 35 the lay-out scene comprising the FOV in LOP 2 of the illuminated lay-out properties of lens 26 relative to the lay-out orienting means contained in assembly 24. This lay-out orienting mean, two-coordinate grid 24C, is described and shown in FIGS. 2B and 3. An example of a lay-out scene is shown in FIG. 4.

The precise location of a lay-out orienting means in LOP 2 is not critical to the invention. It is located in the FOV of a LOP relative to an emission of light which is suitable for orienting the lay-out properties of a lens and directed toward and through the lens. An alternative location in the FOV of LOP 2 in FIG. 1, as described in FIG. 2B, can be for example on the surface of beam splitter 23 or 27.

In the first embodiment, the refractive scene and the lay-out scene are produced in ROP 1 and LOP 2, respectively, in separate fields of view as shown for example by schematic eyes 32A and 36A, respectively.

All references to beam splitter means in the invention refer to the flat glass type. In general, any surface which will or can be made to in part reflect and in part transparently transmit fulfills the requirements of a beam splitter means within the scope of this invention. Although pellicle beam splitters and prism type beam splitters can be used, they are usually cost prohibitive.

The schematic of FIG. 11 corresponds to the embodiments of FIGS. 1, 6, 7, 9, and 10. Beam splitters 23 and 27 of these embodiments correlate respectively to beam splitters B1 and B2 in the schematic of FIG. 11. These two beam splitters are used together to direct a substantially collinear section of ROP 1 and LOP 2. This collinear section is preferably passed perpendicular through lens 26 as shown in the embodiments. Lens 26 corresponds to lens L of the schematic of FIG. 11. The collinear section between beam splitters 23 and 27 of these embodiments correlates to collinear path CD of FIG. 11. Unlike the right angle orientation of beam splitter B1 relative to path CD in FIG. 11, beam splitter 23 relative to LOP 2 in FIG. 1 is angled for observation convenience by a technician as depicted by schematic eye 36A. In the embodiments shown in FIGS. 1, 6, 7, 9, and 10, the emissions of light ROP 1 and LOP 2 are directed oppositely through lens 26 in this collinear section due to the placement of the light source means 20 and 33 at the end of ROP 1 and LOP 2, respectively.

A conventional beam splitter directs two emissions of light into one FOV or splits one emission of light into two FOV. By contrast, in this invention, each beam splitter 23 and 27 shown in the embodiments of FIGS. 1, 6, 7, 9 and 10 and the schematics in FIGS. 11, 12, 14, 15, and 16, transparently transmits one emission of light into one FOV, while reflectively diverging the other into another FOV. For example, in FIG. 1 the function of beam splitter 23 is to pass at least in part the emission of light traveling along ROP 1 transparently from collimating lens 20C to blocker lens stage assembly 24, while reflecting at least in part the emission of light traveling along LOP 2 from blocker lens stage assembly 24 to magnifying lens 35. The function of beam splitter 27 is to pass substantially transparently at least in part the emission of light traveling along ROP 1 from lens 26 to penta prism 30, while reflecting at least in part the emission of light traveling along LOP 2 from light source means 33 to lens Lens 26 is positioned in a substantially perpendicular plane to this collinear section and against lens support means 25F described in connection with FIG. 2A.

Preferably, light traps 22 and 29 are positioned on beam splitters 23 and 27 and against the second incident surface to LOP 2. These light traps 22 and 29 are used to prevent ambient background light interference with the emission of light reflected from reflecting surface 70 met by the emission of light traveling in LOP 2. An example of light trap material is a metal plate with a black non-reflective coating. Alternately, a non-reflective coating may be applied to non-reflective surface 72 of both beam splitters 23 and 27. Each light trap 22 and 29 or non-reflecting surface 72 has an aperture 21 and 28, respectively. The first light trap 22 with aperture 21 substantially serves as a uniform background for the FOV transmitted to schematic eye 36A, by reflection of the emission of light from reflecting surface 70 of first beam splitter 23. Second light trap 29 with aperture 28 prevents ambient light from being passed from behind and through the second beam splitter 27. Therefore, the emission of light traveling LOP 2 from beam splitter 27 is produced primarily by the ROP 2 light source means such as lamp and collimating lens 33.

Apertures 21 and 28 are defined by an opening in each light trap 22 and 29, respectively. The emission of light directed along ROP 1 is substantially unaffected when transmitted through each of the apertures 21 and 28. An emission of light comprised of multiple light beams which have not been reduced in width by afocal means can be accommodated by multiple apertures 21A, B, and C and 28A, B, and C, respectively, in light traps 22 and 29 as shown in the embodiment of FIG. 6.

The following elements are located between beam splitter 27 and lens 26: (1) lens holder 39 capable of holding lens 26 against lens stop 25F and designed to avoid obstructing the emission of light directed in ROP 1; (2) a conventional three-point lens marker 40 as found in Vertometer or Marco Lensmeter or as modified and described below; and (3) a conventional block holder and block 41 as found in the Speede Blocker manufactured by AIT Industries or the Accu-Bloc manufactured by Opti-Vue, Inc.

Each of these three elements 39, 40, and 41 can be attached to separate arms (not shown) mounted onto the support frame 42 shown in cross-section. The arms are capable of retraction to a non-interfering or idle position. When the lens holder arm is deployed in operable position, lens 26 is held firm against lens stop 25F of blocker lens stage 24 shown in FIG. 2. When the lens marker arm is deployed in operable position, lens marker 40 marks the refractive reference points directly onto the surface of lens 26. When the blocker arm is deployed in operable position, lens block 41 is affixed with double-faced tape to the geometric center position of lens 26. Preferably, one arm is used for both blocking and marking. For example, the three pins of a lens marker can be mounted into a typical blocking arm to mark the three refractive reference points, and a typical block with a modified aperture can be fastened over top of the center pin and between the two side pins.

Incorporation of lensmeter elements used otherwise in a conventional embodiment will usually require increasing the distance between a light source means and the electronic light receiving means or reticle telescope tube. Such increased distance is necessary to introduce elements of the invention between them which are used to define ROP 1 and LOP 2. Examples of such elements are beam splitters 23 and 27 shown in FIG. 1 and a lens support means described and shown in FIGS. 2A and 2B.

Therefore, any required modifications as taught by this Specification can be carried out in accordance with conventional optical principles well known in the art. For example, by incorporation of the Vertometer elements shown in FIG. 1, the power of collimating standard lens 20C is modified to project an image of target 20B to a distance as appropriate among lens 26, target 20B, lamp 20A, and reticle telescope tube 31. The dioptric scale calibration of power drum 20D in a reticle telescope lensmeter or the electronic calculation of an electronic lensmeter digitally displayed on a monitor screen can be made to match relevant distance changes.

Both light source means in ROP 1 and LOP 2 preferably have higher intensity than used conventionally to: (1) compensate for the partial transmittance and reflectance by beam splitting means, such as beam splitters 23 and 27, used to direct the emission in ROP 1 and LOP 2; and (2) to compensate for the increased separation distance between the light source means and the FOV in ROP 1 and LOP 2. Potentiometers 37 and 38 can also be optionally employed in each circuit to control the intensity of each light source means, such as lamps 20A and 33A, respectively. An off/on switch 43 can be used to control both light source means wired preferably in series in a normal and conventional manner.

REFERRING TO FIG. 2A

Figure 2A:
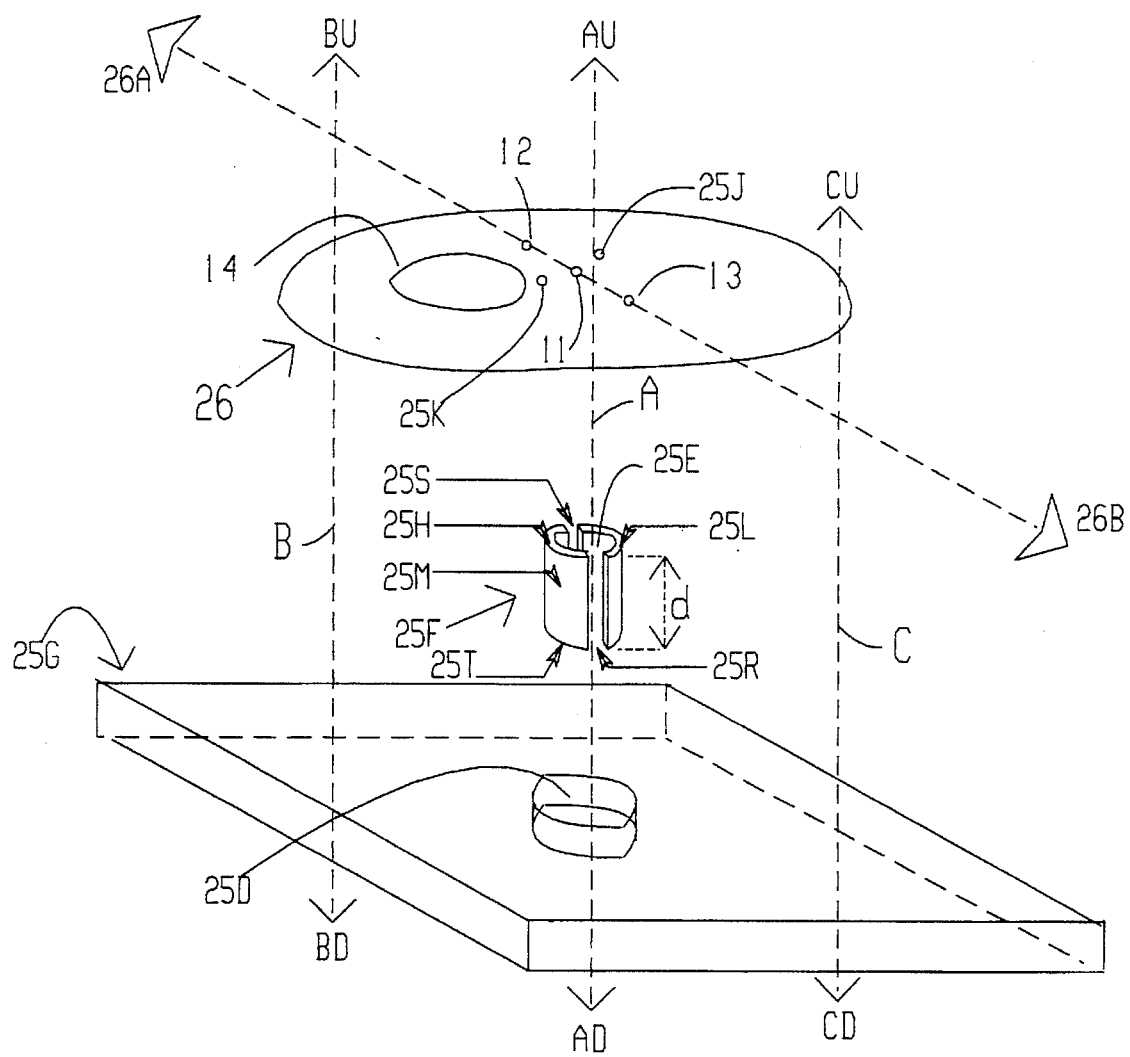
FIG. 2A is an exploded view of lens 26 and a lens support means comprised of lens stop 25F and lens stop support means 25G.

FIG. 2A is an exploded perspective view of a lens support means which permits a lens to be supported in both a ROP and LOP at substantially the same time. For example, lens 26 in FIG. 1 is located in ROP 1. ROP 1 arises from light traveling along a relatively narrow width, that corresponds in part to chain-line A of FIG. 2A. Lens 26 in FIG. 1 is also located in LOP 2. LOP 2 arises from light traveling a relatively wider width corresponding to chain-lines A, B, and C of FIG. 2A. The lens support means is comprised of a lens stop means portion, for example lens stop 25F, and a lens stop support means portion, for example transparent plate 25G.

The lens stop means portion projects from the lens stop support means portion to support a lens at a fixed position in the axis of the ROP and to provide clearance of a lens from the lens stop support means portion. When a concave curve of a lens is to be supported against a lens stop means, this distance must at least provide clearance for the sagittal depth of such concave curve to be supported. For example, lens stop 25F projects from transparent plate 25G at distance d to support lens 26 and to provide clearance from transparent plate 25F of lens 26 supported on top end 25H of lens stop means portion 25F.

The top end of this lens stop means portion is preferably of a relatively small dimension and substantially circular, as shown for example by top end 25H of lens stop 25F. Unlike the three widely spaced lens supports of a blocker, this top end functions like a conventional lensmeter lens stop as a single ledge for support of lens 26 at a fixed distance in a ROP.

The lens stop means portion can be hollow or solid. Preferably it is substantially tubular and symmetrically disposed about its axis. For example, when the lens stop means portion is hollow as shown by lens stop 25F, it can have a thin outside structure 25L and 25M surrounding center opening 25E and disposed symmetrically about its axis represented by chain line A. This outside structure 25L and 25M for example can be made of a transparent material such as acrylic or an opaque material such as nylon to prevent lens scratching. When the lens stop means portion is solid, it can be comprised for example of a homogeneous optical material such as a transparent acrylic rod having a uniform diameter throughout its length, and terminating into flat circular surfaces which are equal and parallel.

When a lens stop means is hollow, light can travel through its opening along chain line A through opening 25E of lens stop 25F. Unlike the three widely spaced lens supports of a blocker, but like a conventional lensmeter lens stop, lens stop 25F permits a relatively narrow beam of light which defines a ROP to pass through it. Of course a lens stop means could be wider than used conventionally, but would serve no purpose for passing a wider ROP through it where the multifocal segment of a lens would interfere with refractive orientation. When the lens stop means is a solid homogeneous optical material, this emission preferably passes perpendicular through its parallel end surfaces to prevent prismatic displacement.

The outside structure of a hollow lens stop means can be cut into two semi-sections along its axis as shown for example by semi-sections 25L and 25M of lens stop 25F. Two openings 25R and 25S located between these two semi-sections 25L and 25M permit observation of points 11, 12, and 13 in a LOP from a planar FOV along the lens stop means axis represented by chain line A. For example an emission of light passing along chain line A, in either direction as depicted by arrows AU and AD, permits observation of points 11, 12, and 13 without obstruction by semi-sections 25L and 25M, when lens 26 is laterally decentered in either direction depicted by arrows 26A or 26B.

A lens stop means portion defines the dimension of the emission of light passing through it and through the supported lens. When the lens stop means is hollow, the dimensions of its center opening within the outside structure determines the width of such emission. For example, the diameter of opening 25E in lens stop 25F determines the width dimension of light traveling along chain line A through lens 26. When the lens stop means is a solid homogeneous optical material, the dimensions of such emission passing through it are defined by the dimension of the optical material because as a refracting medium, such emission passes through the material at a different speed than through adjacent air.

Figure 2B:
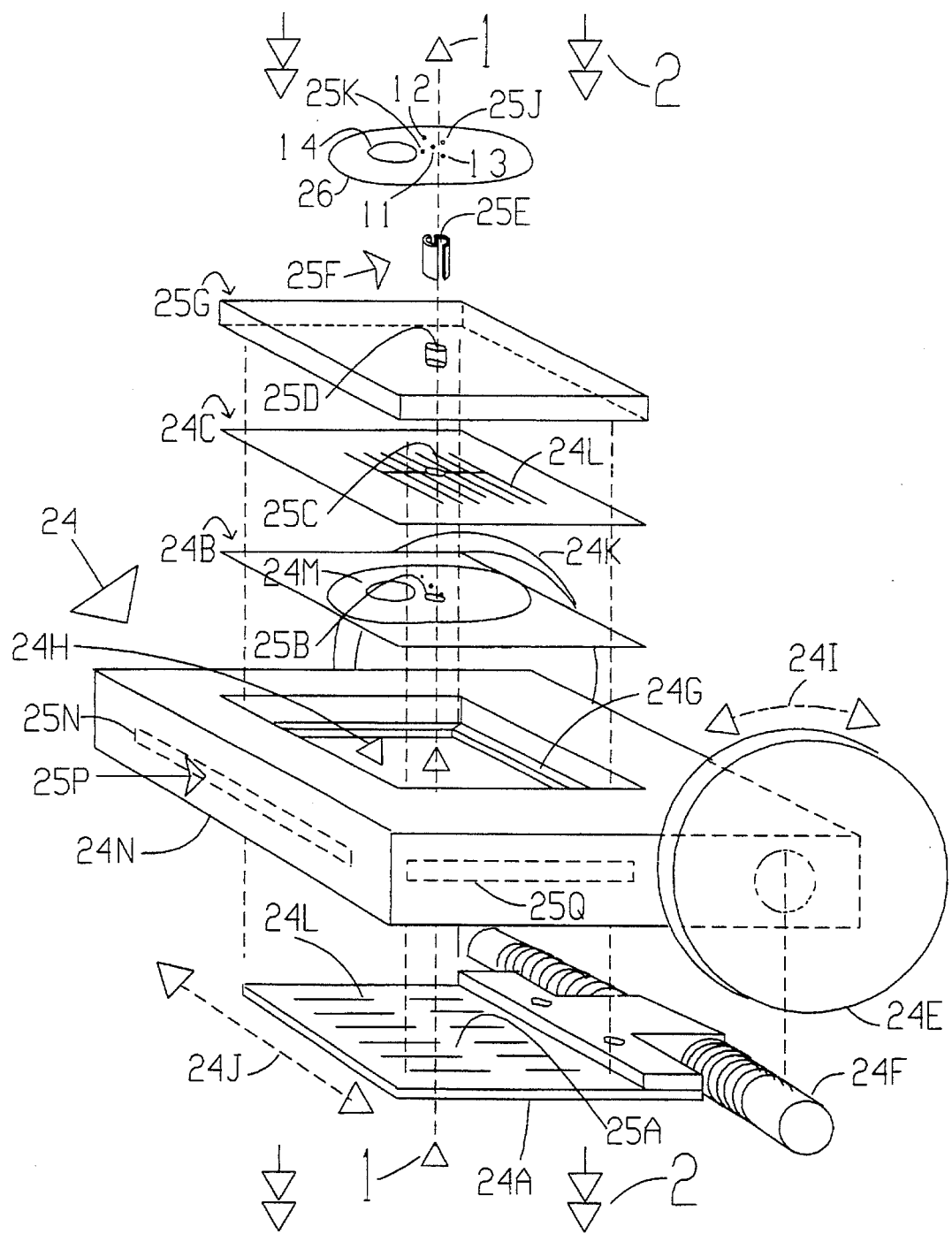
FIG. 2B is an exploded view of modified elements contained within a blocker lens stage assembly 24.

A second part of the lens support means is the lens stop support means portion for: (1) fixing the position of the lens stop means portion relative to light passing through a lens stop means portion such as lens stop 25F; and (2), unlike the opaque housing of a lensmeter which supports a conventional lensmeter lens stop, passing light through it in both a ROP and a LOP, at least to an extent that the lay-out properties of a lens, such as multifocal 14 and points 11, 12, and 13 of lens 26, and the refractive characteristics of lens 26 can be oriented relative to an orienting means. For example, as shown in FIG. 2A, transparent plate 25G allows substantially transparent passage of light such as passing along chain line A in a width between chain lines B and C. Plate 25G can be attached to frame 42 relative to ROP 1 and LOP 2 as shown in FIG. 1 or preferably incorporated into blocker lens stage assembly 24 as shown in FIG. 2B, which assembly in turn is attached to such frame. Arrows AU, AD, BU, BD, CU, and CD, of chain lines A, B, and C, respectively, exemplify that light can travel in either direction through a supported lens on a lens support means.

The lens stop means portion is preferably fixed to the lens stop support means portion. For example, the bottom 24P of each semi-section 25L and 25F of lens stop 25F or the bottom of a solid homogeneous optical material can be mounted into opening 25D of plate 25G. Of course, both portions of the lens stop support means such as portions 25F and 25G could be made as a one piece construction, such as can be molded or machined. Another example of a lens support means is an arm attached between a support frame means with an opening in its top end for lens support, and positioned such as not to interfere with light used for lens orienting. Preferably for use in blocking however, the lens stop means portion is symmetrically supported by the lens stop support means portion to sustain pressure from a blocking arm.

A FOV of an emission of light passes through a lens supported on a lens support means in either direction as described above, is restricted by the lens stop means portion such as lens stop 25F. For example the outside structure surrounding a hollow open space or the refractive passage of an emission of light through a solid homogeneous optical material restricts the FOV of such emission of light.

Preferably, to permit the widest planar FOV of light passing through a lens supported on a lens support means, the axes of the following are collinear: (1) the emission of light in a ROP, such as passing along chain line A; (2) the emission of light in a LOP, such as passing along and between chain lines B and C; (3) the lens stop means portion, such as chain line A; (4) the lens stop means portion top end, such as chain line A; and (5) a supported lens, such as chain line A.

REFERRING TO FIG. 2B.

FIG. 2B is an exploded perspective view of the following elements shown collectively incorporated into a conventional blocker lens stage assembly 24: (1) a moveable lay-out orienting means such as transparent multifocal centering plate 24A; (2) a shadow receiving means such as semi-frosted screen 24B; and (3) a lay-out orienting means such as transparent two-coordinate grid 24C. Additionally shown from FIG. 2A are (4) a lens stop means, lens stop 25F, and (5) a lens stop support means, transparent plate 25G.

In FIG. 1, blocker lens stage assembly 24 is shown positioned in the collinear section of ROP 1 and LOP 2 between beam splitters 23 and 27. Blocker lens stage frame 24N is preferably attached to support frame 42 shown in FIG. 1.

A detailed description of these conventional elements 24A–C along with novel modifications required to function in accordance with the invention is as follows.

A lay-out orienting means is provided in LOP 2 for orienting, relative to its calibrations, the lay-out properties of a lens. An example of such means is two-coordinate transparent measuring grid 24C which has novel features especially designed and adapted for this invention and which is shown in detail in FIG. 3. Grid 24C is preferably fixed in a perpendicular plane relative to a LOP. The precise location of a lay-out orienting means is not critical to the invention. It is located in the FOV in LOP 2 relative to a lens to reference the position of the its lay-out properties. Another example of an equivalent alternative for positioning a refractive orienting means is in LOP 2 FOV on the surface of beam splitter 23 or 27 shown in FIG. 1. Preferably as shown in FIG. 2B, a lay-out orienting means such as measuring grid 24C is positioned within close proximity of lens 26 to avoid any significant amount of parallax when a technician makes a direct observation along LOP 2.

To substantially transparently transmit or pass light along ROP 1, grid 24C is modified by substituting slim points in place of conventional thick grid lines. For example, as shown in FIG. 3, when light in ROP 1 comprises one narrow light beam, slim points 25I are substituted at vertex 25C in the center of grid 24C in place of the conventional thick parallel grid lines 24L. If the emission of light in ROP 1 comprises multiple light beams, of course such substitution can be provided at each position of the grid through which a light beam would be directed to pass.

For orienting non-marked multifocal segments of a lens, a shadow receiving means such as screen 24B is preferred. A shadow receiving means is positioned in LOP 2 after the emission of light directed in LOP 2 passes through a lens such that shadows of the lens' lay-out properties are cast onto the shadow receiving means. These shadows are transmitted in LOP 2 FOV for example to schematic eye 36A shown in FIG. 1 or CCD 36B of FIG. 7. The order of screen 24B and grid 24C is optional.

For example, these shadows cast from lens 26 appear as: (a) the outline of any multifocal segment such as segment 14 shown in FIG. 4; (b) the outline of lens 26; (c) two of the three conventional refractive reference points such as points 12 and 13; and (d) the calibrations of a lay-out orienting means such as the two-coordinate uniform parallel lines 24L of transparent measuring grid 24C shown in FIGS. 3 and 5.

In order to direct an emission of light in ROP 1 through a shadow receiving means without significantly interfering with the refractive orientation of lens 26, one of two approaches are utilized in this invention.

One approach is to modify the shadow receiving means, in a way that is in comparison to that found in the art, to permit passage of the emission of light in ROP 1 by simply removing a portion of the shadow receiving means or replacing a portion of the shadow receiving means with something that will not significantly interfere with passage of the light used to orient or measure the refractive characteristics of a lens. For example, semi-frosted screen 24B is modified as shown in FIG. 2B by an opening or aperture 25B, to permit substantially transparent passage of the light. Of course multiple apertures can also be provided for each single beam of a widely spaced emission as shown in FIG. 6. An aperture in the shadow receiving means, such as aperture 25B in screen 24B, determines the maximum width of each light beam of an emission. To provide maximum surface area of a shadow receiving means, each light beam of an emission is preferably narrow. The conventional four to six millimeter width of the single beam emission of a reticle telescope tube or afocal reduction of multiple beam emission in an electronic lensmeter can be easily accommodated by selecting a suitably sized aperture 25B.

Another approach is to provide a method for inserting and removing the shadow receiving means from ROP 1. For example, a slot represented by chain line 25N shown in FIG. 2B can be cut into blocker lens stage frame 24N so that a shadow receiving means can be inserted and removed along guides 25P of blocker lens stage frame 24N. By removing a shadow receiving means from ROP 1, ROP 1 is not as restricted in width.

Another example of a shadow receiving means is an electronic light receiving means. An electronic position sensor plate which along with associated electronic circuitry produces an image of the shadows on a monitor screen and is a commercially available product. However, such a sensor plate is preferably modified with apertures for passage of light in ROP 1 in accordance with the teachings of this Specification and the invention. It is preferably positioned in LOP 2 under the moveable lay-out orienting means such as multifocal centering plate 24A.

Multifocal centering plate 24A is modified by elimination of thick uniform parallel lines 24L stamped in its center in an area 25A so that ROP 1 will pass transparently without obstruction when plate 24A is moved laterally in a direction represented by arrows attached to chain line 24J. The method of laterally orienting a multifocal segment 11 is described in connection with FIG. 5.

The image of the lay-out properties as shown in FIGS. 2A are not observed as shadows through an opening such as aperture 25B in a light receiving means such as semi-frosted screen 24B, but are observed illuminated in the LOP FOV. For example, point 11 is observed in the FOV in LOP 2 through the following apertures: aperture 25A of transparent multifocal centering plate 24A; aperture 25B of semi-frosted screen 24B; aperture 25C of transparent measuring grid 24C; aperture 25D of transparent plate 25G; and opening 25E of lens stop 25F.

Additionally, lens marker 40 shown in FIG. 1 can be modified to mark an upper refractive reference point 25J and lower refractive reference point 25K as shown in FIG. 2 on the surface of lens 26. The shadows of these modified points 25J and 25K cast onto the shadow receiving means can be used along with cylinder axis points 12 and 13 for orientation in relation to a lay-out orienting means. Preferably these modified points 25J and 25K lie in a vertical meridian along with point A moveable lay-out orienting means is provided for centering the multifocal segment 14 of lens 26 in LOP 2 relative to the fixed lay-out orienting means such as grid 24C. An example of such moveable means is a typical transparent multifocal centering plate 24A which has parallel vertical lines. This moveable means is also preferably positioned within close proximity of lens 26 to reduce parallax when directly observed.

A moveable lay-out orienting means such as multifocal centering plate 24A is preferably attached to the bottom of blocker lens stage assembly 24. A moving means is provided to position the moveable lay-out orienting means in relation to a fixed orienting means. For example, multifocal centering plate 24A may be slidably moved by hand along a guide (not shown) cut into support frame 42 shown in FIG. 1. An example of a conventional moving means uses knurled knobs 24E and 24K attached to each end of helical gear shaft 24F. Rotating knurled knobs 24E and 24K in a direction depicted by single-headed arrows of chain line 24I moves multifocal centering plate 24A in a direction depicted by chain line 24J. Other means for moving plate 24A may be used.

Blocker lens stage assembly 24 has opening 24H which contains ledge 24G that will support elements 25G and 24A–C shown in FIG. 2B. When transparent plate 25G is used as the lens stop support means, plate 25G replaces the conventional cover plate of a conventional blocker lens stage assembly.

These elements 25F and 24A–C can be individually attached to a support frame means such as frame 42 shown in FIG. Alternately, multifocal centering plate 24A and grid 24C could be placed in the FOV in LOP 1 without being placed in the collinear path, for example, between beam splitter 23 and condensing lens 35 shown in FIG. 1.

Preferably these elements 25F and 24A–B are positioned within close proximity to lens L to prevent parallax when directly observed in the FOV in LOP 2 by a technician. A shadow receiving means such as screen 24B is preferred to be positioned within close proximity to lens 26 to receive shadows cast of the lay-out properties of lens
REFERRING TO FIG. 3.

FIG. 3 shows a top planar view of two-coordinate transparent measuring grid 24C. Grid 24C is modified to prevent obstruction of the emission of light traveling ROP 1 at least to a degree that does not interfere in making measurements relevant to the refractive orientation of lens 26 by substituting the thick uniform parallel grid lines 24L with slim points. For example, for passage of a narrow ROP 1, the lines 24L otherwise present at vertex 24C are substituted with slim points 25I.
REFERRING TO FIGS. 4 AND 5.

FIG. 4 is an example of a conventional lay-out scene. FIG. 5 is an example of a conventional refractive scene. The mathematical relationship between prismatic deviation P shown in the refractive scene of FIG. 5, and linear decentration h shown in the lay-out scene of FIG. 4 of a lens having a dioptric power d is described by Prentice's Law as follows:

$$P=(h)(d)$$

Since the two scenes appear simultaneously, this mathematical relationship is visually demonstrated as shown in FIGS. 4 and 5 for the first time in a way not heretofore available to the lens grinding art. In the lay-out scene of FIG. 4, horizontal linear decentration h of lens 26 is represented by the distance measured between optical center point 11 and vertex 17 relative to horizontal axis 9 calibrated in centimeters. This linear decentration h in the lay-out scene of FIG. 4 simultaneously induces prism power P shown in the refractive scene of FIG. 5. Prism power P in the refractive scene of FIG. 5 is represented by the distance measured between target vertex 8 and vertex 18 of sphere lines 4 and cylinder lines 5 relative to concentric circles 6 of the reticle calibrated in prism diopters 7.

For the first time in this art the invention also permits lens 26 to be geometrically centered and blocked based upon prismatic deviation P pursuant to Prentice's Law, eliminating the need to both observe the lay-out scene and mark refractive reference points 11, 12, and 13. For example, a single vision lens of d=+2.00 diopters required to be linearly decentered h=5 centimeters to the right of vertex 17 along horizontal axis 9, induces a P=1 prism diopter as follows:

$$1P=(0.5\ cm)(+2.00)$$

As shown in FIG. 1, lens 26 can be oriented in a substantially horizontal plane to both ROP 1 and LOP 2 supported against lens stop 25F, so that target vertex 18 in the refractive scene of FIG. 5 subtends the 1 prism diopter ring of prism reticle 6 on horizontal axis 19 to the right of vertex 8. Block 41 shown in FIG. 1 can be secured onto the surface of lens 26 at this geometric center by deployment of a blocking arm in a way otherwise conventional in the art.

As shown in the lay-out scene of FIG. 4, a multifocal 14 of lens 26 can be positioned vertically in relation to a lay-out orienting means, for example by the linear calibrations of vertical axis 10 of measuring grid 24L. Multifocal 14 can be positioned horizontally by placing the corresponding parallel lines 16 of a centering means, such as multifocal centering plate 24A shown in FIG. 2, tangent to the horizontal edges of multifocal 14 and referencing center parallel line 15 to a lay-out orienting means, such as the linear calibrations of horizontal axis 9 of measuring grid 24L.

Also for the first time in the lens grinding art, the invention permits verification of sphere, cylinder, cylinder axis, and prism simultaneously in a refractive scene, prior to, during the course of, or subsequent to orienting a lens in a lay-out scene. Such verification prior to blocking prevents the common error of blocking a cylinder lens off-axis when it is shifted to its geometric grinding center position.

In summary, the following advantages are not available by current methods: (1) observation of both a lay-out scene and a refractive scene produced simultaneously which visually demonstrates Prentice's Law; (2) continuous verification of the refractive characteristics and refractive orientation of a lens prior to, during, or subsequent to geometric centering; and (3) and blocking a lens by prismatic deviation pursuant to Prentice's law.

Second Embodiment

REFERRING TO FIG. 6.

FIG. 6 illustrates a second embodiment of the present invention having substantially all of the same components as in the above-described first embodiment shown in FIG. 1. Explanation of duplicate components having the same labels is omitted.

The emission of light in ROP 1 shown for example in the second embodiment is comprised of three separate light beams 74, 75, and 76 emitted from light source means 45. Light source means 45, for example, could comprise a single light source directing an emission of light through a multiple pin hole mask, three light emitting diodes, or three laser emissions. Of course this emission could comprise other numbers of light beams, and the light beams can be in other relative positions to each other.

The width of the emission of light in ROP 1 of the second embodiment is wider than the emission of ROP 1 shown in the first embodiment of FIG. 1. These light beams in ROP 1 impinge on an electronic light receiver, such as electronic analysis plane 32C, after passing through the following elements with the effects described in FIGS. 1, 2, and 3: (1) three apertures 21A, 21B, and 21C of first light trap 22; (2) first beam splitter 23; (3) multiple modified apertures of elements incorporated in blocker lens stage 24 described in FIGS. 2B and 3; (4) lens 26; (5) second beam splitter 27; and (6) three apertures 28A, 28B, and 28C of the second light trap 29. The plane 32C is connected to associated electronic circuitry 32D wired in accordance with well known technology through a video output connector 73 to a monitor screen not shown.

Figure 8A:
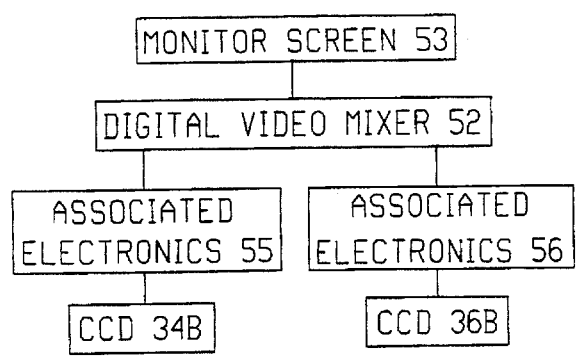
FIG. 8A is a block diagram showing electrical connection between two CCD's 32B and 36B, their associated electronics 55 and 56, a digital video mixer 52, and a monitor screen 53.
Figure 8B:
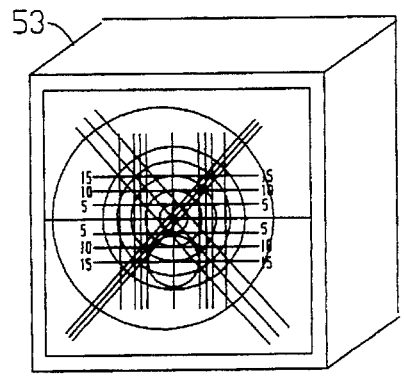
FIG. 8B shows a monitor screen 53 displaying a lay-out superimposed with a refractive scene which can result from applying this invention.

A refractive orienting means can be produced electronically or stamped on the monitor screen face plate relative to the image position of the light beams. In this embodiment, there is no refractive orienting means positioned in ROP 1. A monitor screen with superimposing a FOV of a ROP and LOP is shown in FIG. 8B.

Third Embodiment

REFERRING TO FIG. 7.

FIG. 7 illustrates a third embodiment of the present invention having substantially all of the same components as in the first embodiment of FIG. 1. Explanation or description for duplicate components having the same labels is omitted.

In the third embodiment, two charge-coupled devices, CCD's 32B and 36B, respectively, are in the FOV of ROP 1 and LOP 2, respectively, correlating to schematic eyes 32A and 36A, respectively, in the first embodiment of FIG. 1. Each CCD 32B and 36B has associated electronic circuitry (not shown) with video output connectors 57 and 58, respectively. An example of a CCD is the B/W Video Board Camera manufactured by Computar, Commack, N.Y.

The CCD's 32B and 36B are shielded from ambient light within the third embodiment. Index dial 31D of centering reticle 31B is accessible in opening 44 to permit manual reticle axis adjustment.

Preferably, the two scenes are observed superimposed as described below in FIGS. 8A, 8B, and 9. Alternately, the two scenes can be observed separately by connecting each video output connector 57 and 58 to separate monitors (not shown). The two scenes can also be observed separately on the same monitor by connecting video output connectors 57 and 58 to the same monitor screen wired in a conventional manner through an electronic video sequential switcher (not shown), such as model TC8121 manufactured by Burle.

The position of each CCD 32B and 36B and the convergent power of their condensing lenses 59 and 60 respectively, can be adjusted by optical principles well-known in the art to display a FOV of the following, respectively: (1) a refractive scene such as shown in FIG. 5 comprised of the emission of light in ROP 1 relative to a refractive orienting means as described in FIGS. 1 and 5; and (2) a lay-out scene such as shown in FIG. 4 comprised of the emission of light illuminating lens 26 in LOP 2 relative to a lay-out orienting means as described in FIGS. 2B, 3, and 4. Alternately in this embodiment, the orienting means of both ROP 1 and LOP 2, can be on the monitor screen.

REFERRING TO FIG. 8A.

A digital video mixer 52 can digitally synchronize the two video outputs of associated electronic circuitry 55 and 56 of CCD's 32B and 36B, respectively used to produce a superimposed image on monitor screen 53 of a refractive scene such as shown in FIG. 5 and a lay-out scene such as shown in FIG. 4. FIG. 8A shows a block electrical diagram of the third embodiment shown in FIG. 7 of a conventional parallel circuit of the following: (1) two CCD's 32B and 36B; (2) two associated electrical circuits 55 and 56; (3) digital video mixer 52; and (4) monitor screen 53. An example of a digital video mixer is the Panasonic WJ-AVE5. The electronics of digital video mixer 52 can be incorporated within the embodiment exposing its controls.

This embodiment can produce color or black-and-white images of each superimposed scenes. A target, such as target 20B shown in FIG. 1, can be tinted to chromatically contrast for example its sphere lines 4 and cylinder lines 5 shown in FIGS. 5 and 8C into the superimposed white field of a lay-out scene produced for example by white light. Brightness of each emission of light from a light emission means, such as lamps 20A and 33A shown in FIG. 7, can be controlled by separate potentiometers 37 and 38 respectively, to provide illumination contrast between the two superimposed scenes.

REFERRING TO FIG. 8B.

FIG. 8B shows monitor screen 53 superimposing a FOV of both a conventional refractive scene shown in FIG. 5 and a conventional lay-out scene shown in FIG. 4. Increasing the size of monitor screen 54 increases the size of the calibrations of both orienting means and thus the accuracy of verifying, marking, centering, and blocking a lens.

REFERRING TO FIG. 8C.

Figure 8C:
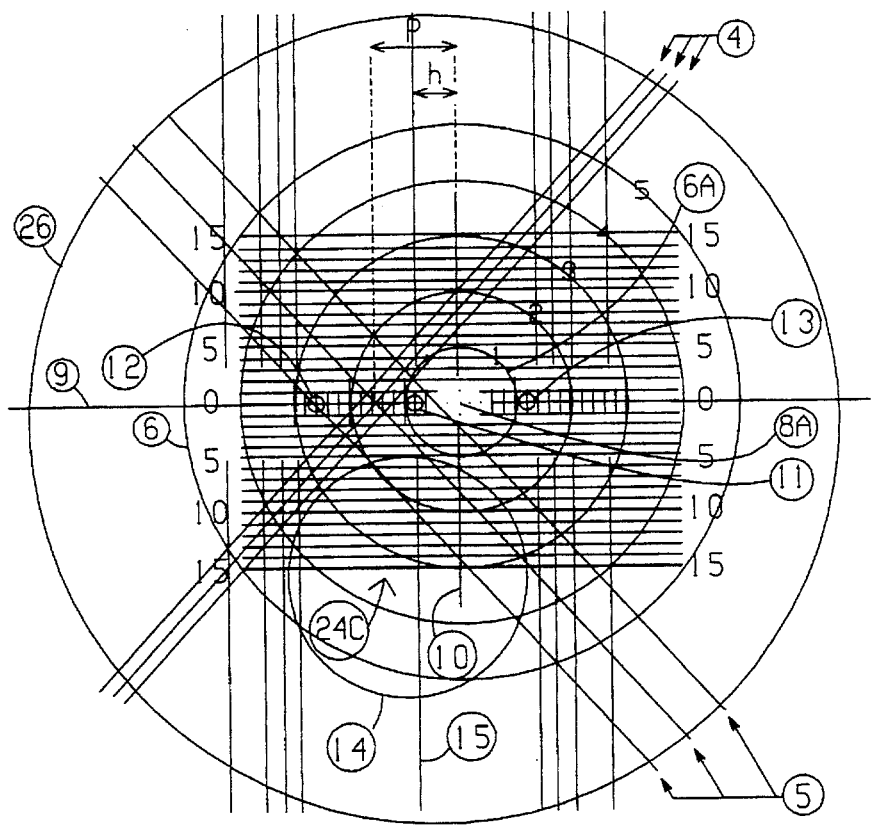
FIG. 8C shows the refractive scene of FIG. 4 superimposed with the lay-out scene of FIG. 5 that can result from applying this invention.

FIG. 8C shows in detail a superimposed scene of the lay-out scene of FIG. 4 with the refractive scene of FIG. 5. This superimposed scene is produced by electronic means in the third embodiment of FIG. 7 and by optical means in the fifth embodiment of FIG. 10. When the superimposed scene is produced on a monitor screen, both orienting means can be in the FOV on such monitor screen in contrast to being positioned in ROP 1 and LOP 2.

Preferably, the vertices and linearly calibrated references of both orienting means are superimposed as follows. For example, the superimposed vertex 8A in FIG. 8C is comprised of the vertex of a refractive orienting means, such as vertex 8 of concentric circles 6 in the centering reticle shown in FIG. 6 coincident with the vertex of the lay-out orienting means, such as vertex 17 of modified transparent measuring grid 24C shown in FIG. 3. The prismatic deviation calibration of a refractive orienting means, such as reticle 31B, is equated with the linear calibration of a lay-out orienting means, such as grid 24C shown in FIG. 2, pursuant to Prentice's Law. For example, the diameter of 1 prism diopter circle 6A of the reticle in the refractive scene of FIG. 5 is equated with the linear calibrated distance of 1 centimeter of two-coordinate axes 9 and 10 of measuring grid 24C of the lay-out scene shown in FIG. 4.

As illustrated in the superimposed scene of FIG. 8C, 1 prism diopter circle 6A subtends the 5 millimeter linear calibration on both sides of coincident vertex 8A on each of both two-coordinate axes 9 and 10. Therefore, the 1 millimeter linear increments on the two-coordinate axes 9 and 10 of grid 24C in the superimposed scene of FIG. 8C also represent increments of 0.2 prism diopters.

Marked optical center refractive reference point 11, prior to linear decentration, lies at superimposed vertex 8A in the superimposed scene representing both zero prismatic deviation and zero linear decentration. The relationship between a lens' linear decentration h and prismatic deviation P as described by Prentice's Rule in FIGS. 4 and 5, can be observed as shown in FIG. 8C in one FOV.

By incorporation of an electronic refractive light receiving means, such as a photosensitive position sensor plate with associated electronic circuitry, the refractive scene and lay-out scene can be electronically superimposed on a monitor screen by adjusting the video input/output between digital mixer 52 and the light receiving means as known by current art.

From an automation standpoint, the benefit of a superimposed scene such as shown in FIG. 8C is obvious: a lens can be oriented and blocked by simultaneous observation of a refractive and lay-out scene in one FOV which demonstrates Prentice's Law, P=hd. Both observations are made without substantial change in location of the lens once it has been properly oriented.

Fourth Embodiment

REFERRING TO FIG. 9.

FIG. 9 illustrates a fourth embodiment of the present invention having substantially all of the same components as in the second embodiment shown in FIG. 6.

The difference in the fourth embodiment is that CCD 36B with condensing lens 60 is in the FOV of LOP 2, correlating to schematic eye 36A in FIG. 6. As described in FIG. 7, CCD 36B of FIG. 9 is connected to a monitor screen through associated electronic circuitry and video output connector 58. A lay-out orienting means, such as grid 24C shown in FIG. 2, can be electronically produced on a monitor screen, stamped on the face plate of a monitor screen, or placed in LOP 2 as described in FIG. 2.

The two scenes can be electronically superimposed on a monitor screen through video output connectors 73 and 58 as described in FIGS. 7, 8A, 8B, and 8C.

Fifth Embodiment

REFERRING TO FIG. 10.

FIG. 10 illustrates a fifth embodiment of the present invention using optical means to produce the superimposed scene shown in FIG. 8C. Duplicate components shown in the first embodiment of FIG. 1 having the same labels in the fifth embodiment will not be further explained.

The fifth embodiment illustrates alteration of both ROP 1 and LOP 2 shown in the first embodiment of FIG. 1, which permit an erect optical superimposition of both scenes at a light receiving means such as schematic eye 32C of FIG. 10, without the use of electronics.

In ROP 1, the emission of light after passing through beam splitter 27 travels in a direction represented by single wire arrows through dove prism 66 and through telescope reticle tube 31 aligned vertically in contrast to horizontally as shown in the first and second embodiments of FIGS. 1 and 7, respectively. The emission of light in ROP 1 is shown for example projecting the refractive scene, comprised of the image of target 20B and reticle 31B, onto projection screen 64. Such projection can be accomplished by either of the following projection optics: (1) replacing the conventional objective lens mount assembly 31A with an appropriately modified lens system assembly; or (2) adding a relay lens system to objective lens mount assembly 31A as is well-known in the art.

Light from projection screen 64 is passed to beam splitter 63 which reflects and reverts this light through magnifying lens 65 in ROP 2 in the FOV of schematic eye 32C. Dove prism 66 corrects the inversion of ROP 1 caused by reflection from beam splitter 63. Other means of inverting this image along ROP 1 by optical principles are well-known in the art.

Opening 67 in the embodiment permits axial adjustment of the index dial 31D of reticle 31B.

The emission of light in LOP 2, after emerging from blocker lens stage 24, travels in a direction represented by double wire arrows to beam splitter 23. Unlike the angular orientation of beam splitter 23 in the first and second embodiments, beam splitter 23 is angled to reflect the emission in LOP 2 toward the rear of the second embodiment. This emission is then reflected upward by first mirror 61 to second mirror 62 which reflects this emission to beam splitter 63. This emission is at least in part transparently transmitted by beam splitter 63 and then through magnifying lens 65 in the FOV of a technician depicted by schematic eye 32C. In this instance, third beam splitter 63 performs as a conventional beam splitter, i.e. merging two separate images, one reflected and the other transparently transmitted.

The particular advantage to this embodiment is the optical superimposition of the emission of light in both ROP 1 and LOP 2 by third beam splitter 63 in one FOV without inversion or reversal due to inversion of ROP 1 by dove prism 66 and the reflectively folded arrangement of LOP 2 by beam splitter 23 and mirrors 61 and 62.

Preferably, pursuant to the mathematical relationship described by Prentice's Law, the linear calibrations of the superimposed scenes in the FOV are equated as described in FIG. 9. This can be accomplished by altering the image size of the telescopically magnified refractive scene cast on projection screen 64 by adjusting the projection optics in ways well-known in the art.

SCHEMATIC CONFIGURATIONS

REFERRING TO FIGS. 11–16.

FIGS. 11–16 depict various block diagrams showing optical configurations for directing two substantially collinear observation paths through a lens. One observation path can be used for the ROP and the other for the LOP. Each emission of light traveling an observation path can comprise one or more light beams. Ambient light, not material to the invention, reflected from or passed through a beam splitter is not shown.

It is important to note that FIGS. 11–16 are schematic and focus primarily upon directing observation paths. Other observation path configurations will be clear to a person of average skill in the art based upon disclosure in this Specification and in these schematics. Incorporation of the following elements previously discussed are not shown: (1) light source means; (2) electronic light receiving means; (3) refractive orienting means or lay-out orienting means; (4) lens support means for supporting lens L; (5) frame support means for supporting the elements; (6) moveable orienting means for lateral orientation of the lay-out properties of lens L; (7) a means for blocking 41; (8) means for marking 40; (9) means for holding lens L; and (10) a shadow receiving means for use with multifocal lenses.

FIGS. 11A, 11B, 12A, 12B, and 13A have the same elements but show different directions of observation paths.

Figure 11A:
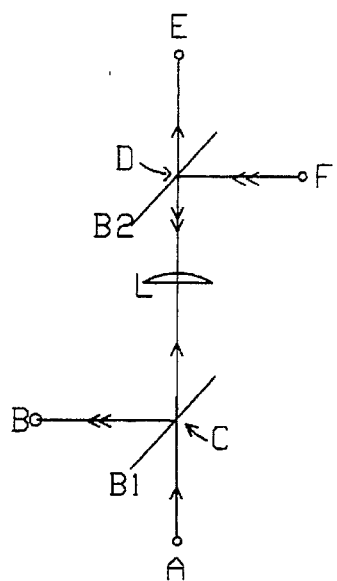
FIG. 11A is a schematic diagram showing two observation paths AE and FD-DC-CB directed collinearly in opposite directions through lens L into two FOV at E and B, respectively.
Figure 11B:
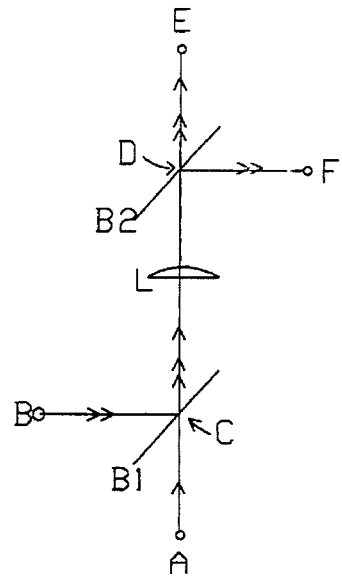
FIG. 11B is a schematic diagram showing two observation paths AE and BC-CD-DF directed collinearly through lens L in the same direction into two FOV at E and F, respectively.

FIGS. 11A and 11B show two observation paths directed by two beam splitters B1 and B2 as follows: (1) a first linear path AE passes at least in part transparently through beam splitters B1 and B2; and (2) a second folded path BC-CD-DF is reflected by beam splitters B1 and B2. The advantage of FIGS. 11A and 11B is that path AE is linear and has no critical alignment of the elements for light traveling in a direction from A to E or from E to A. Therefore, this path is preferred for a ROP.

FIG. 11A shows the paths traveling in opposite directions through lens L. The direction of the emission traveling path AM is depicted by single-headed arrows, and the direction of light traveling path BC-CD-DF is depicted by double-headed arrows. In the embodiments shown in FIGS. 1, 6, 7, 9 and 10, the ROP 1 corresponds to path AE and a light source means is located at A. In the embodiments of FIGS. 1 and 7, light path AE at E is altered by a penta prism 30 and passed through reticle telescope reticle tube 31 in a FOV of a schematic eye 32A or CCD 32B, respectively. In the embodiment of FIG. 10, path AE at E is altered by dove prism 66 and third beam splitter 62.

Figure 12A:
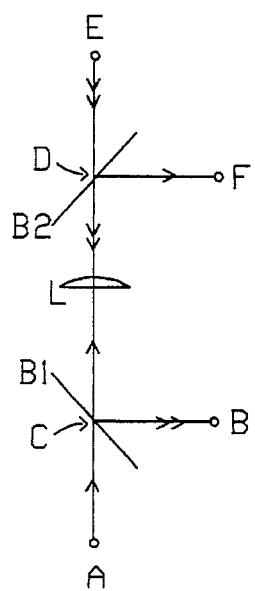
FIG. 12A is a schematic diagram showing two observation paths AD-DF and EC-CB directed collinearly through lens L in opposite directions into two FOV at F and B, respectively.

In the embodiments of FIGS. 1, 6, 7, 9 and 10, the position of a light source means in LOP 2 correlates to F. In the embodiments shown in FIG. 1, 6, 7, and 9, LOP 2 follows path FD-DC-CB. Beam splitter 23 in FIG. 10, which corresponds to beam splitter B1 in FIG. 12, shows the possibility of changing the angle of beam splitter B1 to reflect LOP 2 toward the rear of the embodiment. LOP 2 shown in FIG. 10, corresponding to path F-DC-CB at B of FIG. 12A, is altered by two mirrors 61 and 62. Position B in FIG. 11 corresponds to schematic eye 36A in FIG. 1 and CCD 36B in FIG. 7.

FIG. 11B shows both emissions of light traveling in the same direction through lens L. The direction of the emission traveling path AE is depicted by single-headed arrows, and the direction of light traveling path BC-CD-DF is depicted by double-headed arrows. The disadvantage for the application of orienting a lens where two emissions travel in the same direction through lens L, such as shown in FIG. 11B, is that the fields of observation are not discrete, i.e. emissions from both A and B are received at both E and F. Of course, the emission in each path AE and BC-CD-DF could be alternately turned on and off.

Figure 12B:
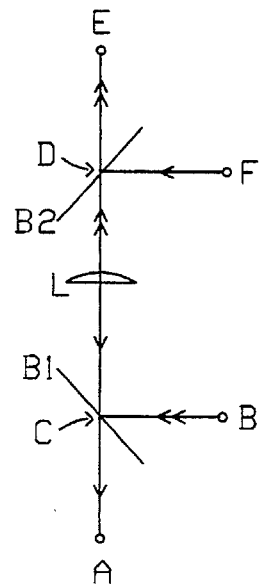
FIG. 12B is a schematic diagram showing two observation paths FD-DA and BC-CE directed collinearly through lens L in opposite directions into two FOV at A and E, respectively.

In FIGS. 12A and 12B there is no linear path. FIG. 12A also shows the possibility of changing the angular orientation of beam splitter B1, correlating to beam splitter B1 in FIGS. 11A and 11B, which changes the direction of the emission reflected from beam splitter B1 in relation to beam spitter B2. In FIG. 12A, the two paths directed by beam splitters B1 and B2 travel in opposite directions through lens L as follows: (1) light traveling a direction depicted by single-headed arrows from A follows path AC-CD-DF passing at least in part transparently through beam splitter B1 and lens L, and is at least in part reflected by beam splitter B2 to F; (2) light traveling in a direction depicted by double-headed arrows from E follows path ED-DC-CB passing at least in part transparently through beam splitter B1 and lens L, and is at least in part reflected by beam splitter B1 to B. Here positions B and F correspond to locations for respectively receiving a ROP FOV and a LOP FOV, or vice versa depending upon the optical devices placed in each path. This arrangement has relatively little advantage over FIGS. 11A and 11B except to provide for re-arrangement of the elements.

In FIG. 12B and 12A emission travels the two paths in opposite directions through lens L as follows: (1) light traveling in a direction depicted by single-headed arrows from A follows path AC-CD-DF passing at least in part transparently through beam splitter B1 and lens L, and is at least in part reflected by beam splitter B2 to F; (2) light traveling in a direction depicted by double-headed arrows from B follows path BD-CD-DE at least in part reflected from beam splitter B1, passing at least in part transparently through lens L and beam splitter B2 to E. Here positions A and E correspond to locations for respectively receiving a ROP FOV and LOP FOV, or vice versa depending upon the optical devices placed in each path. This arrangement has relatively little advantage for orienting a lens over the previous schematics except to provide for re-arrangement of the elements.

Figure 13A:
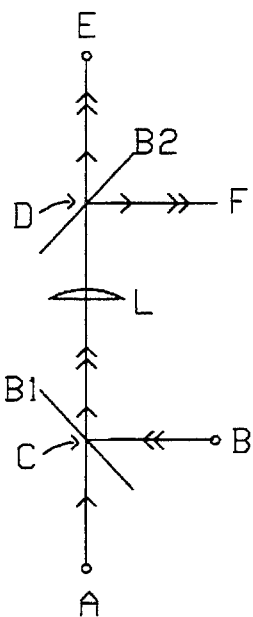
FIG. 13A is a schematic diagram showing two observation paths AE and BC-CD-DF directed collinearly through lens L in the same direction into two FOV at E and F, respectively.
Figure 13B:
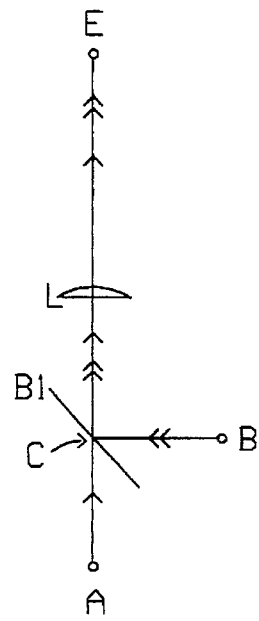
FIG. 13B is a schematic diagram showing two observation paths AE and BC-CE directed collinearly through lens L in the same direction into one FOV at E.

FIGS. 13A and 13B show two light sources A and B passing two light emissions depicted by single- and double-headed arrows, respectively, in the same direction through lens L from beam splitter B1.

FIG. 13A shows two light paths directed as follows: (1) light emitted from A follows linear path AE depicted by single-headed arrows through beam splitter B1, lens L, and beam splitter B2 to E; (2) light emitted from B in a direction depicted by double-headed arrows is reflected from beam splitter B1 through lens L and then reflected from beam splitter B2 to F. This arrangement has the advantage of presenting the FOV of both paths AD and BC-CD at both E and F.

FIG. 13B shows two emissions of light directed as follows: (1) light emitted from A follows linear path AD depicted by single-headed arrows through beam splitter B1 and lens L to E; (2) light emitted from B in a direction depicted by double-headed arrows is reflected by beam splitter B1 through lens L to E. Various optical and electronic methods can be devised to observe both scenes at E as follows: (1) a magnifying lens and reticle telescope tube can be alternately swung in and out of path DE at E to observe a layout and refractive scene, respectively; or (2) an electronic light receiving means can be positioned at E to receive both light paths AE and BC-CE and electronically project both onto a monitor screen, electronically magnifying the FOV for both the refractive scene and the lay-out scene.

Figure 14:
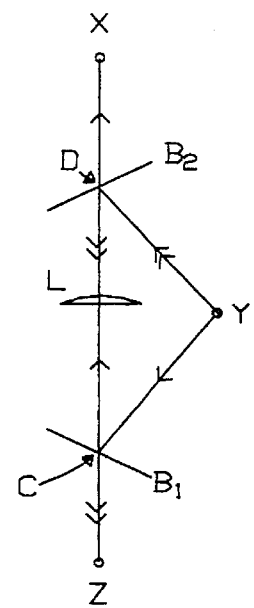
FIG. 14 is a schematic diagram showing two observation paths YC-CX and YD-DZ directed collinearly through lens L in opposite directions into two FOV at X and Z, respectively.

FIG. 14 shows two emissions of light directed as follows: (1) light traveling in a direction depicted by single-headed arrows from Y follows path YC, reflected by beam splitter B1 along path CX through lens L and beam splitter B2 to X; (2) light traveling in a direction depicted by double-headed arrows also from Y follows path YD, reflected by beam splitter B2 along path DZ through lens L and beam splitter B1 to Z. This arrangement has the advantage of using only one position Y for at least one light source means to pass light in opposite directions through the lens L to create separate scenes at X and Z.

Figure 15:
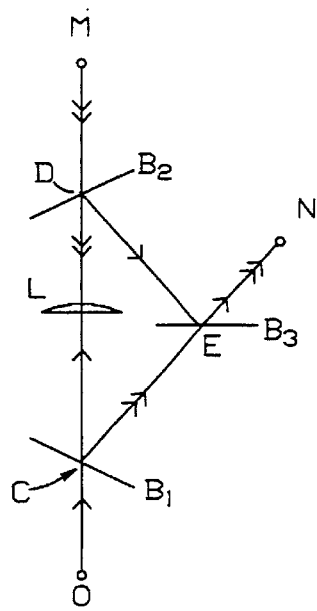
FIG. 15 is a schematic diagram showing two observation paths OD-DE-EN and MC-CN directed collinearly through lens L in opposite directions into one FOV at N.

FIG. 15 shows two emissions of light directed as follows: (1) light traveling in a direction depicted by single-headed arrows from O follows path OD through beam splitter B1 and lens L to beam splitter B2; beam splitter B2 reflects this light along path DE to beam splitter B3; beam splitter B3 reflects the light along path EN to N; (2) light traveling in a direction depicted by double-headed arrows from M follows path MC through second beam splitter B2 and lens L to beam splitter B1; beam splitter B1 reflects this light along path CE to beam splitter B3 which in turn reflects the light along path EN also to N. This arrangement has the advantage of one FOV at N to receive a superimposed scene produced by light emitted from M and O.

Figure 16:
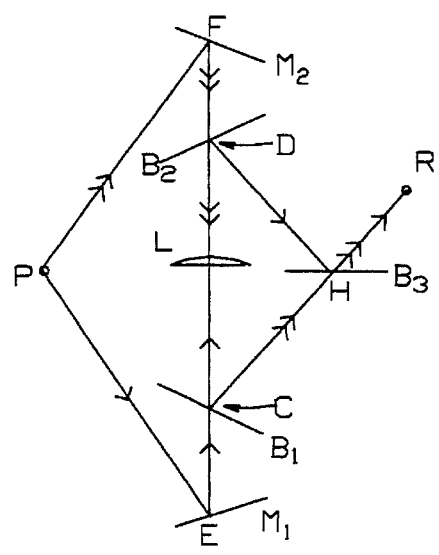
FIG. 16 is a schematic diagram showing two observation paths PE-EC-CD-DH-HR and PF-FD-DC-CH-HR directed collinearly through lens L in opposite directions into one FOV at R.

FIG. 16 shows two emissions of light directed as follows: (1) light traveling in a direction depicted by single-headed arrows from P follows path PE and is reflected by mirror M1 along path ED through lens L to beam splitter B2; beam splitter B2 reflects this light along path DH to beam splitter B3; beam splitter B3 reflects this light along path HR to R; and (2) light traveling in a direction depicted by double-headed arrows from P follows path PF and is reflected by mirror M2 along path FC through beam splitter B2 and lens L to beam splitter B1; beam splitter B1 reflects this light along path CR through beam splitter B3 to R. This arrangement has the advantage of receiving both scenes at R produced by light from a single position P.

The invention which is claimed is:

1. An apparatus that combines: (a) equipment having a refractive light source that is capable of emitting at least one refractive light beam which defines a refractive observation path which both passes through a lens when properly positioned therein and which terminates in a refractive field of view; with (b) equipment having a lay-out light source capable of emitting at least one lay-out light beam which defines a lay-out observation path which passes through said lens when properly positioned therein and which terminates in a lay-out field of view; said apparatus characterized in that there is added a means for directing at least a portion of both said at least one refractive light beam and said at least one lay-out light beam to simultaneously pass through said lens when said lens is properly positioned.

2. The apparatus of claim 1, wherein said means for directing at least a portion of both said at least one refractive light beam and said at least one lay-out light beam comprises: a beam splitter means located so that when said at least one refractive light beam and said at least one lay-out light beam travel from their respective one or more sources to their respective one or more detection systems, one of (a) said at least one refractive light beam and (b) said at least one lay-out light beam is reflected from a surface of said at least one beam splitter means, while the other passes substantially transparently through said surface of said at least one beam splitter means either alternately or substantially simultaneously.

3. The apparatus of claim 2, wherein said at least one beam splitter means comprises a first beam splitter means and a second beam splitter means, wherein said first and second beam splitter means are located so that: a first beam selected from a group of beams consisting of: (a) said at least one refractive light beam and (b) said at least one lay-out light beam; is reflected from a surface of said first beam splitter means while a second beam, different from said first beam, selected from said group of beams passes substantially transparently through said surface of said first beam splitter means and then a third beam selected from said group of beams is reflected from a surface of said second beam splitter means while a fourth beam, different from said third beam, selected from said group of beams, passes substantially transparently through said surface of said second beam splitter means either alternately or substantially simultaneously.

4. The apparatus of claim 3, wherein there is an observation means for superimposing directly or indirectly said refractive field of view and said lay-out field of view at a location so as to be observed substantially at said location alternately or substantially simultaneously.

5. The apparatus of claim 3, wherein at least one of said first and second splitter means for in part transparently transmitting said at least one refractive light beam and in part reflecting said lay-out light beam is movable; whereby said lay-out light beam after passing through said lens is at least in part reflected by said moveable beam splitter means, and said at least one refractive light beam passes at least in part transparently through said moveable beam splitter means.

6. The apparatus of claim 2, wherein there is an observation means for superimposing directly or indirectly said refractive field of view and said lay-out field of view at a location so as to be observed substantially at said location alternately or substantially simultaneously.

7. The apparatus of claim 1, wherein there is an observation means for superimposing directly or indirectly said refractive field of view and said lay-out field of view at a location so as to be observed substantially at said location alternately or substantially simultaneously.

8. The apparatus of claim 7, wherein said observation means comprises a means for electrically converting said lay-out field of view into a first set of electrical signals representative of any image corresponding to said lay-out field of view and converting said refractive field of view into a second set of electrical signals representative of any image corresponding to said refractive field of view and converting said first and second sets of electrical signals into separate or superimposed observable images.

9. The apparatus of claim 7, wherein said observation means comprises a means for optically superimposing said lay-out and said refractive fields of view.

10. The apparatus of claim 9, wherein said observation means for superimposing said lay-out and said refractive fields of view comprises a path orienting means for optically orienting said at least one lay-out light beam prior to said lay-out field of view into a path collinear with that of said at least one refractive light beam prior to said refractive field of view so that images within said refractive and said lay-out fields of view are superimposed.

11. The apparatus of claim 10, wherein said path orienting means comprises a beam splitter means located so that a first light beam selected from a group of light beams consisting of (a) said at least one refractive light beam and (b) said at least one lay-out light beam is reflected from a surface of said beam splitter means while a second light beam different from said first light beam, selected from said group of light beams, passes substantially transparently through said surface of said beam splitter means either alternately or substantially simultaneously; whereby orienting said beam splitter at an appropriate angle causes images in both said lay-out field of view and said refractive field of view to become substantially superimposed.

12. A method for orienting at least one refractive characteristic of a lens by means of at least one refractive light beam suitable for orienting said at least one refractive characteristic of said lens; and for orienting at least some lay-out properties of said lens by means of at least one lay-out light beam, which lay-out light beam is suitable for orienting said lens in relation to said at least some lay-out properties of said lens; said method comprising:

passing said at least one refractive light beam along one or more refractive observation paths; wherein said one or more refractive observation paths terminate in a refractive field of view;

passing said at least one lay-out light beam along at least one lay-out observation path; wherein said at least one lay-out observation path terminates in a lay-out field of view;

directing at least a portion of both said refractive and said lay-out light beams to move respectively along a refractive observation path and a lay-out observation path which are oriented so as to alternately or substantially simultaneously pass through said lens when said lens is properly positioned;

whereby, when said lens is properly positioned, said refractive field of view can be used to orient said at least one refractive characteristic of said lens relative to said at least one refractive light beam; and wherein said lay-out field of view can be used to orient said at least some lay-out properties of said lens by means of said at least one lay-out light beam.

13. The method of claim 12, wherein said directing said at least a portion of both said refractive and said lay-out light beams comprises orienting at least a portion of their respective light paths so that they are collinear along at least one segment of their respective observation paths in a location which contains said lens when said lens is properly positioned; whereby said refractive and lay-out observation paths substantially simultaneously pass through said lens when said lens is properly positioned.

14. The method of claim 13, wherein said directing said at least a portion of both said refractive and said lay-out light beams comprises reflecting a first light beam selected from a group of light beams consisting of (a) said at least one refractive light beam and (b) said at least one lay-out light beam from a surface of at least one beam splitter means while a second light beam different from said first light beam, selected from said group of light beams, passes substantially transparently through said at least one beam splitter means either alternately or substantially simultaneously.

15. The method of claim 14, wherein images from said lay-out and said refractive fields of view are superimposed directly or indirectly upon each other so as to be observed at substantially a single location alternately or substantially simultaneously.

16. The method of claim 15, wherein said method for superimposing is done electrically by converting said lay-out image of said lay-out field of view into a first set of electrical signals representative of said lay-out image and converting said refractive image of said refractive field of view into a second set of electrical signals representative of said refractive image and displaying a combined image by converting said first and second sets of electrical signals into a superimposed observable image.

17. The method of claim 13, wherein said directing said at least a portion of both said refractive and said lay-out light beams comprises reflecting a first light beam selected from a group of light beams consisting of (a) said at least one refractive light beam and (b) said at least one lay-out light beam from a surface of a first beam splitter means while a second light beam different from said first light beam, selected from said group of light beams passes substantially transparently through said surface of said first beam splitter means and simultaneously reflecting a third beams selected from said group of light beams from a surface of a second beam splitter means while a fourth beam different from said third beam, selected from said group of light beams passes substantially transparently through said surface of said second beam splitter means either alternately or substantially simultaneously.

18. The method of claim 17, wherein images from said lay-out and said refractive fields of view are substantially superimposed directly or indirectly upon each other so as to be observed at substantially a single location alternately or substantially simultaneously.

19. The method of claim 18, wherein said method for superimposing is done electrically by converting said lay-out image of said lay-out field of view into a first set of electrical signals representative of said lay-out image and converting said refractive image of said refractive field of view into a second set of electrical signals representative of said refractive image and displaying a combined image by converting said first and second sets of electrical signals into a superimposed observable image.

20. The method of claim 13, wherein images from said lay-out and said refractive fields of view are superimposed directly or indirectly upon each other so as to be observed at substantially a single location alternately or substantially simultaneously.

21. The method of claim 20, wherein said method for superimposing is done electrically by converting said lay-out image of said lay-out field of view into a first set of electrical signals representative of said lay-out image and converting said refractive image of said refractive field of view into a second set of electrical signals representative of said refractive image and displaying a combined image by converting said first and second sets of electrical signals into a superimposed observable image.

22. The method of claim 20, wherein said method for superimposing is done by optically orienting said images from said at least one lay-out light field of view into a path collinear with that of said at least one refractive light beam so that the images in the fields of view of said refractive light beam and said lay-out light beam are superimposed.

23. The method of claim 22, wherein said method for superimposing optically comprises: reflecting a first beam selected from a group of beams consisting of (a) said at least one refractive light beam and (b) said at least one lay-out light beam from a surface of at least one beam splitter means while a second beam different from said first beams, selected from said group of beams passes substantially transparently through said surface of said at least one beam splitter means either alternately or substantially simultaneously; whereby choosing an appropriate angle of reflection causes any images from both said lay-out field of view and said refractive field of view to become superimposed.

24. The method of claim 12, wherein images from said lay-out and said refractive fields of view are superimposed directly or indirectly upon each other so as to be observed at substantially a single location alternately or substantially simultaneously.

25. The method of claim 12, wherein images from said lay-out and said refractive fields of view are separate and distinct and are observable independently of one another so as to make separate determinations for said orienting of said at least one refractive characteristic of said lens and said at least some of said lay-out properties of said lens.

26. An apparatus for orienting at least one refractive characteristic of a lens and for orienting said lens in relation to at least some of its lay-out properties, said apparatus comprising:
   a. a refractive light source means for emitting at least one refractive light beam, which said at least one refractive light beam is suitable for orienting said at least one refractive characteristic of said lens;
   b. a lay-out light source means for emitting a lay-out light beam, which said lay-out light beam is suitable for orienting said lens in relation to said at least some lay-out properties of said lens;
   c. a refractive orienting means for orienting said at least one refractive characteristic of said lens by means of said at least one refractive light beam;
   d. a lay-out orienting means for orienting said at least some of lay-out properties of said lens by means of said lay-out light beam;
   e. a lens support means for properly locating said lens in said refractive and said lay-out light beams, which lens support means is substantially transparent to light from said refractive and said lay-out light sources; and
   f. a support frame means for fixing locations and orientations of components identified in a.–e. with respect to one another;
   wherein said refractive light source is adapted to be held fixed relative to said support frame so that said at least one refractive light beam emitted from said refractive light source is passed at least in part through said lens support means into a refractive field of view thereby defining a refractive observation path;
   wherein said lay-out light source is adapted to be held fixed relative to said support frame so that said at least one lay-out light beam emitted from said lay-out light source is passed at least in part through said lens support means into a lay-out field of view thereby defining a lay-out observation path;
   wherein said refractive orienting means is located at least in part in said refractive field of view;
   wherein said lay-out orienting means is located at least in part in said lay-out field of view; and
   wherein at least a portion of both said refractive and said lay-out observation paths pass through said lens when said lens is properly located against said lens support means;
   whereby when said lens is held in proper position against said lens support means, said refractive field of view can be used to orient said at least one refractive characteristic of said lens by means of said at least one refractive light beam and said refractive orienting means; and said lay-out field of view can be used to orient said at least some lay-out properties of said lens by means of said lay-out light beam and said lay-out orienting means.

27. The apparatus of claim 26, wherein one of said refractive and said lay-out observation paths is determined by reflection from at least one beam splitter means for in part reflecting while in part substantially transparently transmitting light, and wherein said support frame means fixes location and orientation of said at least one beam splitter means.

28. The apparatus of claim 27, wherein a first beam selected from a group of beams consisting of said at least one refractive and said lay-out light beams is first passed at least in part transparently through said at least one beam splitter means and then transparently through said lens support means into a first field of view selected from a group of fields of view consisting of said refractive and said lay-out fields of view; while a second beam, different from said first beam, selected from said group of beams, either alternately or substantially simultaneously, is first at least in part reflected from said at least one beam splitter means and transparently passed through said lens support means into a second field of view selected from said group of fields of view, different from said first field of view.

29. The apparatus of claim 26, wherein there is additionally two beam splitter means for in part passing substantially transparently and in part reflecting light, wherein said two beam splitter means comprise a first and a second beam splitter means positioned so that said lens support means is located between them; wherein one of said refractive and said lay-out light paths is determined by reflection from said first beam splitter means, and one of said refractive and said lay-out light paths is determined by reflection from said second beam splitter means; and wherein said support frame means fixes locations and orientations of said first and said second beam splitter means.

30. The apparatus of claim 29, wherein a first beam selected from a group of beams consisting of said at least one refractive and said at least one lay-out light beams is passed first at least in part transparently through said first beam splitter means, then transparently through said lens support means, then at least in part passed transparently through said second beam splitter means into a first field of view selected from a group of fields of view consisting of said refractive and said lay-out fields of view; while a second beam different from said first beam, selected from said group of beams, either alternately or substantially simultaneously, is first at least in part reflected by said second beam splitter means, then transparently passed through said lens support means, and then at least in part reflected by said first beam splitter means into a second field of view, different from said first field of view, selected from said group of fields of view.

31. The apparatus of claim 29, wherein a first beam selected from a group of beams consisting of said at least one refractive and said lay-out light beams is first passed at least in part transparently through said second beam splitter means, then transparently through said lens support means, then at least in part transparently through said first beam splitter means into a first field of view selected from a group of fields of view consisting of said refractive and said lay-out fields of view; while a second beam different from said first beam, selected from said group of beams, either alternately or substantially simultaneously, is first at least in part reflected from said second beam splitter means, then transparently passed through said lens support means, then at least in part reflected from said first beam splitter means into a second field of view, different from said first field of view, selected from said group of fields of view.

32. The apparatus of claim 29, wherein a first beam selected from a group of beams consisting of said at least one refractive and said at least one lay-out light beams is first passed at least in part transparently through said first beam splitter means, then transparently through said lens support means, and then at least in part reflected by said second beam splitter means into a first field of view selected from a group of fields of view consisting of said refractive or said lay-out fields of view; while a second beam, different from said first beam, selected from said group of beams either alternately or substantially simultaneously, is first passed at least in part transparently by said second beam splitter means, then transparently passed through said lens support means, and then at least in part reflected by said first beam splitter means into a second field of view, different from said first field of view, selected from said group of fields of view.

33. The apparatus of claim 29, wherein a first beam selected from a group of beams consisting of said at least one refractive and said at least lay-out light beams is first at least in part reflected from said second beam splitter means, then transparently through said lens support means, and then passed at least in part transparently through said first beam splitter means into a first field of view selected from a group of fields of view consisting of said refractive or said lay-out fields of view; while a second beam, different from said first beam, selected from said group of beams either alternately or substantially simultaneously, is first at least in part reflected from said first beam splitter means, then passed transparently through said lens support means, and then passed at least in part transparently through said second beam splitter means into a second field of view, different from said first field of view, selected from said group of fields of view.

34. The apparatus of claim 29, wherein a first beam selected from a group of beams consisting of said at least one refractive and said lay-out light beams is first passed at least in part transparently through said first beam splitter means, then transparently through said lens support means, then split by said second beam splitter into two of either said refractive and said lay-out fields of view, respectively; while a second beam selected from said group of beams, different from said first beam, either alternately or substantially simultaneously, is first at least in part reflected from said first beam splitter means, then passed transparently through said lens support means, then split by said second beam splitter into two of either said refractive and said lay-out fields of view, respectively.

35. The apparatus of claim 26, wherein there is additionally three beam splitter means for in part passing substantially transparently and in part reflecting light, wherein said three beam splitter means comprise a first, a second, and a third beam splitter means positioned so that said lens support means is located between two of said three beam splitter means; wherein reflection by each of said beam splitter means determines at least a portion of one of said refractive and said lay-out observation paths; and wherein said support frame means fixes locations and orientations of said three beam splitter means.

36. The apparatus of claim 35, wherein a first beam selected from a group of beams consisting of said at least one refractive and said lay-out light beams is first passed at least in part transparently through said first beam splitter means, then transparently through said lens support means, then at least in part reflected from said second beam splitter means, then at least in part reflected from said third beam splitter means into a first field of view selected from a group of fields of view consisting of said refractive and said lay-out fields of view; while a second beam selected from said group of beams, different from to said first beam, either alternately or substantially simultaneously, is first passed at least in part transparently through said second beam splitter means, then transparently through said lens support means, then at least in part reflected from said first beam splitter means, then passed at least in part transparently through said third beam splitter means into a second field of view selected from said group of fields of view, different from said first field of view.

37. The apparatus of claim 35, wherein there is additionally a first and second mirror means; wherein said support frame means also fixes said locations and orientations of said first and second mirror means; wherein a first beam selected from a group of beams consisting of said at least one refractive and said at least one lay-out light beams is first passed at least in part transparently through said first beam splitter means, then transparently through said lens support means, then at least in part transparently through said second beam splitter means, then at least in part reflected by said third beam splitter means into a first field of view selected from a group of fields of view consisting of said refractive and said lay-out fields of view; while a second beam selected from said group of beams, different from said first beam, either alternately or substantially simultaneously, is first at least in part reflected by said second beam splitter means, then passed at least in part transparently through said lens support means, then at least in part reflected by said first beam splitter means, then reflected by said first mirror means, then reflected by said second mirror means, then passed at least in part passed transparently through said third beam splitter means into a second field of view selected from said group of fields of view, different from said first field of view.

38. The apparatus of claim 26, wherein said at least one refractive light beam and said at least one lay-out light beam are at least in part collinear.

39. The apparatus of claim 26, wherein said lay-out orienting means additionally comprises:

a. a centering means having a grid for centering a multifocal of said lens in relation to said grid;

b. a moving means for moving said centering means in relation to said grid;

c. a shadow receiving means for receiving shadows projected along a lay-out light path; and d. a fixing means for fixing said lens support means relative to elements referred to in a.–c.;

wherein said elements referred to in a., b., and d., are substantially transparent in said refractive and said lay-out fields of view; and wherein said elements referred to in a.–d. are adapted to be located appropriately in a lens stage assembly, said lens stage assembly in turn being adapted to be held fixed relative to said support frame; and wherein said at least one refractive light beam has a width determined by properties of said lens stage assembly.

40. The apparatus of claim 26, wherein there is additionally a shadow receiving means for receiving shadows projected by said at least one lay-out light beam along said lay-out observation path, and wherein said shadows projected on said shadow receiving means are at least in part passed along said lay-out observation path into said lay-out field of view.

41. The apparatus of claim 26, wherein said lay-out orienting means has at least two coordinates.

42. The apparatus of claim 41, wherein said lay-out orienting means is a measuring grid substantially transparent to said refractive field of view.

43. The apparatus of claim 26, wherein there is additionally a receiving means in said refractive field of view for receiving at least a portion of said at least one refractive light beam.

44. The apparatus of claim 26, wherein there is additionally a receiving means in said lay-out field of view for receiving at least a portion of said at least one lay-out light beam.

45. The apparatus of claim 44, wherein said receiving means is selected from the group of receivers consisting of:

a telescope reticle tube, a charge-coupled device, a monitor screen, and a photosensitive position sensor plate.

46. The apparatus of claim 26, wherein there is additionally a first receiving means in said refractive field of view for receiving at least a portion of said at least one refractive light beam and a second receiving means in said lay-out field of view for receiving at least a portion of said lay-out light beam.

47. The apparatus of claim 46, wherein said first and said second receiving means is a means for producing electrical discharges in response to incident radiant energy.

48. The apparatus of claim 46, wherein said first receiving means is selected from the group of receivers consisting of: a telescope reticle tube, a charge-coupled device, a monitor screen, and a photosensitive position sensor plate.

49. A lay-out orienting means specifically designed and adapted for use in an apparatus for orienting at least one refractive characteristic of a lens and for orienting said lens in relation to at least some of its lay-out properties, said apparatus comprising: a refractive light source means for emitting at least one refractive light beam, which said at least one refractive light beam is suitable for orienting said at least one refractive characteristic of said lens; a lay-out light source means for emitting a lay-out light beam, which said lay-out light beam is suitable for orienting said lens in relation to said at least some lay-out properties of said lens; a refractive orienting means for orienting said at least one refractive characteristic of said lens by means of said at least one refractive light beam; a lay-out orienting means for orienting said at least some of lay-out properties of said lens by means of said lay-out light beam; a lens support means for properly locating said lens in said refractive and said lay-out light beams, which lens support means is substantially transparent to light from said refractive and said lay-out light sources; and a support frame means for fixing locations and orientations of components identified in a.–e. with respect to one another;

wherein said refractive light source is adapted to be held fixed relative to said support frame so that said at least one refractive light beam emitted from said refractive light source is passed at least in part through said lens support means into a refractive field of view thereby defining a refractive observation path;

wherein said lay-out light source is adapted to be held fixed relative to said support frame so that said at least one lay-out light beam emitted from said lay-out light source is passed at least in part through said lens support means into a lay-out field of view thereby defining a lay-out observation path;

wherein said refractive orienting means is located at least in part in said refractive field of view;

wherein said lay-out orienting means is located at least in part in said lay-out field of view; and wherein at least a portion of both said refractive and said lay-out observation paths pass through said lens when said lens is properly located against said lens support means;

whereby when said lens is held in proper position against said lens support means, said refractive field of view can be used to orient said at least one refractive characteristic of said lens by means of said at least one refractive light beam and said refractive orienting means; and said lay-out field of view can be used to orient said at least some lay-out properties of said lens by means of said lay-out light beam and said lay-out orienting means, said lay-out orienting means comprising a grid substantially transparent to said refractive light beam.

50. The lay-out orienting means of claim 41 additionally comprising:

a. a centering means for centering a multifocal of said lens in relation to said grid;

b. a moving means for moving said centering means in relation to said grid;

c. a shadow receiving means for receiving shadows projected along a lay-out light path; and d. a fixing means for fixing said lens support means relative to elements referred to in a.–c.;

wherein said elements referred to in a.–d. are substantially transparent in said refractive and said lay-out fields of view and are adapted to be located appropriately in a lens stage assembly; wherein said lens stage assembly is in turn adapted to be held fixed relative to said support frame; and wherein said at least one refractive beams of light has a width determined by properties of said lens stage assembly.

51. An apparatus for orienting at least one refractive characteristic of a lens and for orienting said lens in relation to at least some of its lay-out properties, said apparatus comprising:

a. one light source means for emitting: at least one refractive light beam, which at least one refractive light beam is suitable for orienting said at least one refractive characteristic of said lens; and for emitting at least one lay-out light beam, which at least one light beam is suitable for orienting said at least some lay-out properties of said lens;

b. a refractive orienting means for orienting said at least one refractive characteristic of said lens by means of said at least one refractive light beam;

c. a lay-out orienting means for orienting said at least some lay-out properties of said lens by means of said lay-out light beam;

d. a lens support means for properly locating said lens in said refractive and said lay-out light beams, which lens support means is substantially transparent to light from said refractive light source means and said lay-out light source means;

e. a first beam splitter means;

f. a second beam splitter means;

g. a support frame means for fixing locations and orientations of components identified in a.–f;

wherein said light source means is adapted to be held fixed relative to said support frame so that when (a) said at least one refractive light beam is emitted from said light source means, and when (b) said at least one lay-out light beam is emitted from said light source means, one of said at least one refractive and said lay-out light beams is first at least in part reflected from said first beam splitter means, then passed transparently through said lens support means, then passed at least in part transparently through said second beam splitter into one of a respective refractive or lay-out field of view; while the other either alternately or substantially simultaneously is first at least in part reflected from said second beam splitter means, then passed transparently through said lens support means, then passed at least in part transparently through said first beam splitter into the other of said respective refractive and lay-out field of view;

wherein said refractive orienting means is located at least in part in said refractive field of view;

wherein said lay-out orienting means is located at least in part in said lay-out field of view;

wherein at least a portion of both said at least one refractive and said at least one lay-out beams paths pass through said lens when said lens is properly supported by said lens support means;

whereby when said lens is held in proper position against said lens support means, said refractive field of view can be used to orient said at least one refractive characteristic of said lens by means of said at least one refractive light beam and said refractive orienting means; and said lay-out field of view can be used to orient said at least some lay-out properties of said lens by means of said at least one lay-out light beam and said lay-out orienting means.

52. The apparatus of claim 51, wherein said at least one refractive light beam and said at least one lay-out light beam are at least in part collinear.

53. The apparatus of claim 51, wherein said lay-out orienting means additionally comprises:
  a. a centering means having a grid for centering a multifocal of said lens in relation to said grid;
  b. a moving means for moving said centering means in relation to said grid;
  c. a shadow receiving means for receiving shadows projected along the lay-out light path; and
  d. a fixing means for fixing said lens i lens support means relative to elements referred to in a.–c.;
  wherein said elements referred to in a., b., and d., are substantially transparent in said refractive and said lay-out light beam; and
  wherein said elements referred to in a.–d. are adapted to be located appropriately in a lens stage assembly, said lens stage assembly in turn being adapted to be held fixed relative to said support frame; and
  wherein said at least one refractive light beam has a width determined by properties of said lens stage assembly.

54. The apparatus of claim 51, wherein there is additionally a shadow receiving means for receiving shadows projected by said at least one lay-out light beam along said lay-out observation path, and wherein said shadows projected on said shadow receiving means are at least in part passed along said lay-out observation path into said lay-out field of view.

55. The apparatus of claim 51, wherein said lay-out orienting means has at least two coordinates.

56. The apparatus of claim 51, wherein said lay-out orienting means is a measuring grid substantially transparent in said refractive field of view.

57. The apparatus of claim 51, wherein there is additionally a receiving means in said refractive field of view for receiving at least a portion of said at least one refractive light beam.

58. The apparatus of claim 57, wherein said first receiving means is selected from the group of receivers consisting of: a telescope reticle tube, a charge-coupled device, a monitor screen, and a photosensitive position sensor plate.

59. The apparatus of claim 51, wherein there is additionally a receiving means in said lay-out field of view for receiving at least a portion of said at least one lay-out light beam.

60. The apparatus of claim 51, wherein there is additionally a first receiving means In said refractive field of view for receiving at least a portion of said at least one refractive light beam and a second receiving means in said lay-out field of view for receiving at least a portion of said lay-out light beam.

61. The apparatus of claim 60, wherein said first and said second receiving means is a means for producing electrical discharges in response to incident radiant energy.

62. The apparatus of claim 60, wherein said first receiving means is selected from the group of receivers consisting of: a telescope reticle tube, a charge-coupled device, a monitor screen, and a photosensitive position sensor plate.

63. An apparatus for orienting at least one refractive characteristic of a lens and for orienting said lens in relation to at least some of its lay-out properties, said apparatus comprising:
  a. a light source means for emitting: at least one refractive light beam, which said at least one refractive light beam is suitable for orienting said at least one refractive characteristic of said lens; and at least one lay-out light beam, which light beam is suitable for orienting said at least some lay-out properties of said lens;
  b. a refractive orienting means for orienting said at least one refractive characteristics of said lens by means of said at least one refractive light beam;
  c. a lay-out orienting means for orienting said at least some lay-out properties of said lens by means of said lay-out light beam;
  d. a lens support means for properly locating said lens in said at least one refractive and said at least one lay-out light beams, which lens support means is substantially transparent to light from said refractive light source means and said lay-out light source means;
  e. a first beam splitter means;
  f. a second beam splitter means;
  g. a third beam splitter means;
  h. a first mirror means;
  i. a second mirror means;
  j. a support frame means for fixing locations and orientations of components identified in a.–i;
  wherein said light source means is adapted to be held fixed relative to said support frame so that when (a) said at least one refractive light beam is emitted from said light source means, and when (b) said at least one lay-out light beam is emitted from said light source means, a first beam selected from a group of beams consisting of said at least one refractive and said at least one lay-out light beams is first reflected at least in part from said first mirror means, then passed transparently through first beam splitter means, then passed transparently through said lens support means, then reflected at least in part from said second beam splitter means, then at least in part reflected by said third beam splitter means into a field of view; while a second beam not identical to said first beam selected from said group of said beams, either alternately or substantially simultaneously, is first reflected at least in part from said second mirror means, then passed transparently through second beam splitter means, then passed transparently through said lens support means, then reflected at least in part from said first beam splitter means, then pass transparently at least in part through said third beam splitter means into said field of view;
  wherein said refractive orienting means is located at least in part in said refractive field of view;
  wherein said lay-out orienting means is located at least in part in said refractive field of view; and
  wherein at least a portion of both said at least one refractive and said at least one lay-out light beams pass through said lens when said lens is properly supported by said lens support means;

whereby when said lens is held in proper position against said lens support means, said field of view can be used to orient: said at least one refractive characteristic of said lens by means of said at least one refractive light beam and said refractive orienting means; and said at least some lay-out properties of said lens by means of said at least one lay-out light beam and said lay-out orienting means.

64. The apparatus of claim 63, wherein said at least one refractive light beam and said at least one lay-out light beam are at least in part collinear.

65. The apparatus of claim 63, wherein said lay-out orienting means additionally comprises:
   a. a centering means having a grid for centering a multifocal of said lens in relation to said grid;
   b. a moving means for moving said centering means in relation to said grid;
   c. a shadow receiving means for receiving shadows projected along the lay-out light path; and
   d. a fixing means for fixing said lens support means relative to elements referred to in a.–c.;
   wherein elements referred to in a., b., and d., are substantially transparent in said refractive and said lay-out fields of view; and
   wherein said elements referred to in a.–d. are adapted to be located appropriately in a lens stage assembly, said lens stage assembly in turn being adapted to be held fixed relative to said support frame; and
   wherein said at least one refractive light beam has a width determined by properties of said lens stage assembly.

66. The apparatus of claim 63, wherein there is additionally a shadow receiving means for receiving shadows projected by said at least one lay-out light beam along said lay-out observation path, and wherein said shadows projected on said shadow receiving means are at least in part in said lay-out field of view.

67. The apparatus of claim 63, wherein said lay-out orienting means has at least two coordinates.

68. The apparatus of claim 67, wherein said lay-out orienting means is a measuring grid substantially transparent to said refractive field of view.

69. The apparatus of claim 63, wherein there is a reticle telescope tube means located in said refractive field of view, said reticle telescope tube for receiving at least a portion of said at least one refractive light beam.

70. An apparatus that combines: (a) equipment having a refractive light source that is capable of emitting at least one refractive light beam which defines a refractive observation path which both passes through a lens when properly positioned therein and which terminates in a refractive field of view and optionally, a detection system for said at least one refractive light beam suitable for orienting at least one refractive characteristic of said lens; with (b) equipment having a lay-out light source capable of emitting at least one lay-out light beam which defines a lay-out observation path which passes through said lens when properly positioned therein and which terminates in a lay-out field of view; said apparatus characterized in that at least a portion of both said at least one refractive light path and said at least one lay-out light path simultaneously pass through said lens when said lens is properly positioned.

* * * * *